United States Patent
Yu et al.

(10) Patent No.: US 12,107,538 B2
(45) Date of Patent: Oct. 1, 2024

(54) PHOTOVOLTAIC SYSTEM AND POWER SUPPLY SYSTEM

(71) Applicant: Huawei Digital Power Technologies Co., Ltd., Shenzhen (CN)

(72) Inventors: Ting Yu, Shanghai (CN); Tiansan Lin, Shenzhen (CN); Jieling Tang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/328,902

(22) Filed: Jun. 5, 2023

(65) Prior Publication Data

US 2023/0308050 A1     Sep. 28, 2023

Related U.S. Application Data

(63) Continuation of application No. PCT/CN2020/137619, filed on Dec. 18, 2020.

(51) Int. Cl.
*H02S 40/36* (2014.01)
*H02M 7/44* (2006.01)
*H02S 40/32* (2014.01)

(52) U.S. Cl.
CPC ............... *H02S 40/36* (2014.12); *H02M 7/44* (2013.01); *H02S 40/32* (2014.12)

(58) Field of Classification Search
CPC ........... H02S 40/36; H02S 40/32; H02M 7/44
See application file for complete search history.

(56) References Cited

U.S. PATENT DOCUMENTS 10,316,365 B2 *   6/2019   Chute ................. C12Q 1/6876

* cited by examiner

*Primary Examiner* — Jayne L Mershon
(74) *Attorney, Agent, or Firm* — Maier & Maier, PLLC

(57) ABSTRACT

The photovoltaic system includes a first inverter circuit, a second inverter circuit, and a switch circuit. When the switch circuit is in the first state, a first photovoltaic array is connected to the direct current positive bus and the neutral bus through the switch circuit, and a second photovoltaic array is connected to the neutral bus and the direct current negative bus through the switch circuit. When the switch circuit is in the second state, the first photovoltaic array is connected to the neutral bus and the direct current negative bus through the switch circuit, and the second photovoltaic array is connected to the direct current positive bus and the neutral bus through the switch circuit. A potential of the photovoltaic array is changed to prevent a PID effect from occurring when the photovoltaic array is at a negative potential for a long time.

20 Claims, 14 Drawing Sheets

PHOTOVOLTAIC SYSTEM AND POWER SUPPLY SYSTEM

CROSS-REFERENCE TO RELATED APPLICATIONS

This application is a continuation of International application No. PCT/CN2020/137619, filed on Dec. 18, 2020, the disclosure of which is hereby incorporated by reference in its entirety.

TECHNICAL FIELD

The embodiments relate to the field of power supply technologies, a photovoltaic system, and a power supply system.

BACKGROUND

With continuous exhaustion of traditional energy, use of renewable energy for power generation attracts increasing attention. For example, solar energy, wind energy, or water energy is converted into electric energy. A photovoltaic system is used as an example. A typical photovoltaic system includes a photovoltaic array, a direct current/direct current (DC/DC) converter, and a direct current/alternating current (DC/AC) converter.

A conventional photovoltaic system is a unipolar system, and a voltage level of the system is a maximum voltage between a direct current positive bus BUS+ and a direct current negative bus BUS−. A safety voltage of each part of the system is also designed based on the voltage level.

When a unipolar photovoltaic system is operating, a potential induced attenuation (PID) phenomenon which is a PID effect for short exists if no voltage boost apparatus is disposed. In a long term, a fill factor, a short-circuit current Isc of a photovoltaic module, and an open-circuit voltage Voc of the photovoltaic module are reduced, and a service life of the photovoltaic module is reduced after long-term operation.

SUMMARY

The embodiments may provide a photovoltaic system and a power supply system, to suppress a PID effect, prolong a service life of a photovoltaic string, and reduce a safety voltage level.

An embodiment may provide a photovoltaic system. The photovoltaic system may be a bipolar photovoltaic system, and may include three direct current buses, namely, a direct current positive bus, a direct current negative bus, and a neutral bus. The system includes both a positive potential and a negative potential. A first inverter circuit and a second inverter circuit included in the system operate at a positive potential and a negative potential respectively, and an added switch circuit may switch connection relationships between a photovoltaic array and a positive potential and a negative potential. A first input end and a second input end of the first inverter circuit may be respectively connected to a direct current positive bus and a neutral bus, and a first input end and a second input end of the second inverter circuit may be respectively connected to the neutral bus and a direct current negative bus. The switch circuit includes a first state and a second state. When the switch circuit is in the first state, a first photovoltaic array is connected to the direct current positive bus and the neutral bus through the switch circuit, and a second photovoltaic array is connected to the neutral bus and the direct current negative bus through the switch circuit. When the switch circuit is in the second state, the first photovoltaic array is connected to the neutral bus and the direct current negative bus through the switch circuit, and the second photovoltaic array is connected to the direct current positive bus and the neutral bus through the switch circuit.

In a bipolar photovoltaic system, a photovoltaic array connected to a neutral bus and a direct current negative bus corresponds to a negative potential. Different from a unipolar photovoltaic system, in the bipolar photovoltaic system, most photovoltaic arrays are above a ground potential, that is, are at a positive potential. For a photovoltaic array at a negative potential, when the photovoltaic array operates at the negative potential for a long time, a PID effect is likely to occur, causing a power decrease, and affecting power generation efficiency and a service life of the photovoltaic array. Therefore, to resolve the foregoing problem, in the embodiments, a switch circuit is disposed in a photovoltaic system, to switch connection relationships between the photovoltaic array and direct current buses, so as to change a potential corresponding to the photovoltaic array, and prevent the photovoltaic array from being at a negative potential for a long time. In this way, a PID effect of the photovoltaic array is suppressed. In addition, a manner of suppressing the PID effect is different from a conventional manner. In the manner, there is no additional power supply to raise a potential, but a switch circuit is directly used to switch between a positive potential and a negative potential. Therefore, hardware is simple, implementation is convenient, and costs are low.

A switch state of the switch circuit may be manually controlled, or may be controlled by a controller, and the controller may switch the state of the switch circuit by a preset cycle. For example, the preset cycle may be one cycle or two cycles. A time length of the preset cycle is not limited in embodiments, and may be set based on an actual requirement. In order that power generation of the photovoltaic system is not affected when the switch circuit performs state switching, the switch circuit may perform switching at night when the photovoltaic array does not output a direct current.

In a possible implementation, the switch circuit includes a first group of switches and a second group of switches. Both the first group of switches and the second group of switches include a first state and a second state. When both the first group of switches and the second group of switches are in the first state, the first photovoltaic array is connected to the direct current positive bus and the neutral bus through the first group of switches, and the second photovoltaic array is connected to the neutral bus and the direct current negative bus through the second group of switches. When both the first group of switches and the second group of switches are in the second state, the first photovoltaic array is connected to the neutral bus and the direct current negative bus through the first group of switches, and the second photovoltaic array is connected to the direct current positive bus and the neutral bus through the second group of switches.

The following describes two implementations of the switch circuit. One is that the switch circuit includes a plurality of single-pole double-throw switches, and the other is that the switch circuit includes a plurality of independent switches.

In a possible implementation, the first group of switches includes a first single-pole double-throw switch and a second single-pole double-throw switch, and the second group of switches includes a third single-pole double-throw switch and a fourth single-pole double-throw switch. A movable contact of the first single-pole double-throw switch is connected to a positive output end of the first photovoltaic array, and a first stationary contact and a second stationary contact of the first single-pole double-throw switch are respectively connected to the direct current positive bus and the neutral bus. A movable contact of the second single-pole double-throw switch is connected to a negative output end of the first photovoltaic array, and a first stationary contact and a second stationary contact of the second single-pole double-throw switch are respectively connected to the neutral bus and the direct current negative bus. A movable contact of the third single-pole double-throw switch is connected to a positive output end of the second photovoltaic array, and a first stationary contact and a second stationary contact of the third single-pole double-throw switch are respectively connected to the neutral bus and the direct current positive bus. A movable contact of the fourth single-pole double-throw switch is connected to a negative output end of the second photovoltaic array, and a first stationary contact and a second stationary contact of the fourth single-pole double-throw switch are respectively connected to the direct current negative bus and the neutral bus. When all of the first single-pole double-throw switch, the second single-pole double-throw switch, the third single-pole double-throw switch, and the fourth single-pole double-throw switch are in the first state, the positive output end and the negative output end of the first photovoltaic array are respectively connected to the direct current positive bus and the neutral bus, and the positive output end and the negative output end of the second photovoltaic array are respectively connected to the neutral bus and the direct current negative bus. When all of the first single-pole double-throw switch, the second single-pole double-throw switch, the third single-pole double-throw switch, and the fourth single-pole double-throw switch are in the second state, the positive output end and the negative output end of the first photovoltaic array are respectively connected to the neutral bus and the direct current negative bus, and the positive output end and the negative output end of the second photovoltaic array are respectively connected to the direct current positive bus and the neutral bus.

The four single-pole double-throw switches may be integrated in one housing. When the controller is included, the controller and the four single-pole double-throw switches may be integrated in one housing. Alternatively, the four single-pole double-throw switches may be disposed independently or may be integrated in one housing in pairs. A bipolar photovoltaic system is used as an example. When switching of corresponding potentials of two photovoltaic arrays is implemented, four single-pole double-throw switches are needed, and when the switch circuit includes a plurality of independent switches, eight independent switches are needed. Therefore, compared with the eight independent switches, the four single-pole double-throw switches have a smaller quantity and lower costs. In addition, the switch circuit may occupy less space, the four switches correspond to fewer control signals, and control is relatively simple and easy to implement.

In a possible implementation, the first group of switches includes a first switch, a second switch, a third switch, and a fourth switch, and the second group of switches includes a fifth switch, a sixth switch, a seventh switch, and an eighth switch. Both a first end of the first switch and a first end of the second switch are connected to a positive output end of the first photovoltaic array, a second end of the first switch is connected to the direct current positive bus, and a second end of the second switch is connected to the neutral bus. Both a first end of the third switch and a first end of the fourth switch are connected to a negative output end of the first photovoltaic array, a second end of the third switch is connected to the neutral bus, and a second end of the fourth switch is connected to the direct current negative bus. Both a first end of the fifth switch and a first end of the sixth switch are connected to a positive output end of the second photovoltaic array, a second end of the fifth switch is connected to the neutral bus, and a second end of the sixth switch is connected to the direct current positive bus. Both a first end of the seventh switch and a first end of the eighth switch are connected to a negative output end of the second photovoltaic array, a second end of the seventh switch is connected to the direct current negative bus, and a second end of the eighth switch is connected to the neutral bus. When all of the first switch, the third switch, the fifth switch, and the seventh switch are in the first state, and all of the second switch, the fourth switch, the sixth switch, and the eighth switch are in the second state, the positive output end and the negative output end of the first photovoltaic array are respectively connected to the direct current positive bus and the neutral bus, and the positive output end and the negative output end of the second photovoltaic array are respectively connected to the neutral bus and the direct current negative bus. When all of the first switch, the third switch, the fifth switch, and the seventh switch are in the second state, and all of the second switch, the fourth switch, the sixth switch, and the eighth switch are in the first state, the positive output end and the negative output end of the first photovoltaic array are respectively connected to the neutral bus and the direct current negative bus, and the positive output end and the negative output end of the second photovoltaic array are respectively connected to the direct current positive bus and the neutral bus.

In this embodiment, eight independent switches are used to implement switching of corresponding potentials of two photovoltaic arrays. Because the eight switches are disposed independently, control and actions of the switches are performed independently, so that a reliable action of each switch can be ensured, and bonding between the switches does not occur, thereby ensuring accurate and correct switching of potentials corresponding to the two photovoltaic arrays.

In a possible implementation, to enable a voltage of the photovoltaic system more flexible and controllable, the photovoltaic system may further include a direct current/direct current DC/DC converter. An input end of the DC/DC converter is connected to the first photovoltaic array and the second photovoltaic array, and an output end of the DC/DC converter is connected to the direct current positive bus, the neutral bus, and the direct current negative bus. An implementation of the DC/DC converter is not limited. For example, the DC/DC converter may be a boost converter, a buck converter, or a buck/boost converter. In addition, all of the inverter circuits and the DC/DC converters provided in the embodiments may operate bidirectionally, that is, may transfer energy from a photovoltaic array to an alternating current power grid, and may transfer energy from the alternating current power grid to a DC/DC converter side. For example, the DC/DC converter is connected to an energy storage battery to store energy.

In a possible implementation, both the first photovoltaic array and the second photovoltaic array are connected to the input end of the DC/DC converter through the switch circuit. For example, the DC/DC converter includes the following two circuits: a first DC/DC circuit and a second DC/DC circuit. The switch circuit includes a first group of switches and a second group of switches. Both the first group of switches and the second group of switches include the first state and the second state. A positive output end and a negative output end of the first DC/DC circuit are respectively connected to the direct current positive bus and the neutral bus, and a positive output end and a negative output end of the second DC/DC circuit are respectively connected to the neutral bus and the direct current negative bus. An output end of the first photovoltaic array is connected to the first group of switches, and an output end of the second photovoltaic array is connected to the second group of switches. When both the first group of switches and the second group of switches are in the first state, the first photovoltaic array is connected to the first DC/DC circuit through the first group of switches, and the second photovoltaic array is connected to the second DC/DC circuit through the second group of switches. When both the first group of switches and the second group of switches are in the second state, the second photovoltaic array is connected to the first DC/DC circuit through the second group of switches, and the first photovoltaic array is connected to the second DC/DC circuit through the first group of switches.

In a possible implementation, the first group of switches includes a first single-pole double-throw switch and a second single-pole double-throw switch, and the second group of switches includes a third single-pole double-throw switch and a fourth single-pole double-throw switch. A movable contact of the first single-pole double-throw switch is connected to a positive output end of the first photovoltaic array. A movable contact of the second single-pole double-throw switch is connected to a negative output end of the first photovoltaic array. A first stationary contact and a second stationary contact of the first single-pole double-throw switch are respectively connected to a positive input end of the first DC/DC circuit and a positive input end of the second DC/DC circuit. A first stationary contact and a second stationary contact of the second single-pole double-throw switch are respectively connected to a negative input end of the first DC/DC circuit and a negative input end of the second DC/DC circuit. The negative input end of the first DC/DC circuit is connected to the positive input end of the second DC/DC circuit. A movable contact of the third single-pole double-throw switch is connected to a positive output end of the second photovoltaic array. A movable contact of the fourth single-pole double-throw switch is connected to a negative output end of the second photovoltaic array. A first stationary contact and a second stationary contact of the third single-pole double-throw switch are respectively connected to the negative input end of the first DC/DC circuit and the negative input end of the second DC/DC circuit. A first stationary contact and a second stationary contact of the fourth single-pole double-throw switch are respectively connected to the positive input end of the first DC/DC circuit and the positive input end of the second DC/DC circuit. When all of the first single-pole double-throw switch, the second single-pole double-throw switch, the third single-pole double-throw switch, and the fourth single-pole double-throw switch are in the first state, the positive output end and the negative output end of the first photovoltaic array are respectively connected to the positive input end and the negative input end of the first DC/DC circuit, and the positive output end and the negative output end of the second photovoltaic array are respectively connected to the positive input end and the negative input end of the second DC/DC circuit. When all of the first single-pole double-throw switch, the second single-pole double-throw switch, the third single-pole double-throw switch, and the fourth single-pole double-throw switch are in the second state, the positive output end and the negative output end of the first photovoltaic array are respectively connected to the positive input end and the negative input end of the second DC/DC circuit, and the positive output end and the negative output end of the second photovoltaic array are respectively connected to the positive input end and the negative input end of the first DC/DC circuit.

In a possible implementation, the first group of switches includes a first switch, a second switch, a third switch, and a fourth switch, and the second group of switches includes a fifth switch, a sixth switch, a seventh switch, and an eighth switch. Both a first end of the first switch and a first end of the second switch are connected to a positive output end of the first photovoltaic array, a second end of the first switch is connected to a positive input end of the first DC/DC circuit, and a second end of the second switch is connected to a positive input end of the second DC/DC circuit. Both a first end of the third switch and a first end of the fourth switch are connected to a negative output end of the first photovoltaic array, a second end of the third switch is connected to a negative input end of the first DC/DC circuit, and a second end of the fourth switch is connected to a negative input end of the second DC/DC circuit. Both a first end of the fifth switch and a first end of the sixth switch are connected to a positive output end of the second photovoltaic array, a second end of the fifth switch is connected to the positive input end of the second DC/DC circuit, and a second end of the sixth switch is connected to the positive input end of the first DC/DC circuit. Both a first end of the seventh switch and a first end of the eighth switch are connected to a negative output end of the second photovoltaic array, a second end of the seventh switch is connected to the negative input end of the second DC/DC circuit, and a second end of the eighth switch is connected to the negative input end of the first DC/DC circuit. The negative input end of the first DC/DC circuit is connected to the positive input end of the second DC/DC circuit. When all of the first switch, the third switch, the fifth switch, and the seventh switch are in the first state, and all of the second switch, the fourth switch, the sixth switch, and the eighth switch are in the second state, the positive output end and the negative output end of the first photovoltaic array are respectively connected to the positive input end and the negative input end of the first DC/DC circuit, and the positive output end and the negative output end of the second photovoltaic array are respectively connected to the positive input end and the negative input end of the second DC/DC circuit. When all of the first switch, the third switch, the fifth switch, and the seventh switch are in the second state, and all of the second switch, the fourth switch, the sixth switch, and the eighth switch are in the first state, the positive output end and the negative output end of the first photovoltaic array are respectively connected to the positive input end and the negative input end of the second DC/DC circuit, and the positive output end and the negative output end of the second photovoltaic array are respectively connected to the positive input end and the negative input end of the first DC/DC circuit.

In a possible implementation, the output end of the DC/DC converter is connected to the direct current positive bus, the neutral bus, and the direct current negative bus through the switch circuit. In this implementation, the switch circuit does not need to be directly connected to the photovoltaic array, so that protection for the photovoltaic array is provided. Because the DC/DC converter includes a controllable switch and can control an operating status of the DC/DC converter, when the switch circuit performs an action, the DC/DC converter is not greatly affected, for example, a signal suddenly changes.

In a possible implementation, the DC/DC converter includes a first DC/DC circuit and a second DC/DC circuit. The switch circuit includes a first group of switches and a second group of switches. Both the first group of switches and the second group of switches include the first state and the second state. An output end of the first photovoltaic array is connected to an input end of the first DC/DC circuit, and an output end of the first DC/DC circuit is connected to the first group of switches. An output end of the second photovoltaic array is connected to an input end of the second DC/DC circuit, and an output end of the second DC/DC circuit is connected to the second group of switches. When both the first group of switches and the second group of switches are in the first state, the first DC/DC circuit is connected to the direct current positive bus and the neutral bus through the first group of switches, and the second DC/DC circuit is connected to the neutral bus and the direct current negative bus through the second group of switches. When both the first group of switches and the second group of switches are in the second state, the first DC/DC circuit is connected to the neutral bus and the direct current negative bus through the first group of switches, and the second DC/DC circuit is connected to the direct current positive bus and the neutral bus through the second group of switches.

In a possible implementation, the first group of switches includes a first single-pole double-throw switch and a second single-pole double-throw switch, and the second group of switches includes a third single-pole double-throw switch and a fourth single-pole double-throw switch. A movable contact of the first single-pole double-throw switch is connected to a positive output end of the first DC/DC circuit, and a first stationary contact and a second stationary contact of the first single-pole double-throw switch are respectively connected to the direct current positive bus and the neutral bus. A movable contact of the second single-pole double-throw switch is connected to a negative output end of the first DC/DC circuit, and a first stationary contact and a second stationary contact of the second single-pole double-throw switch are respectively connected to the neutral bus and the direct current negative bus. A movable contact of the third single-pole double-throw switch is connected to a positive output end of the second DC/DC circuit, and a first stationary contact and a second stationary contact of the third single-pole double-throw switch are respectively connected to the neutral bus and the direct current positive bus. A movable contact of the fourth single-pole double-throw switch is connected to a negative output end of the second DC/DC circuit, and a first stationary contact and a second stationary contact of the fourth single-pole double-throw switch are respectively connected to the direct current negative bus and the neutral bus. When all of the first single-pole double-throw switch, the second single-pole double-throw switch, the third single-pole double-throw switch, and the fourth single-pole double-throw switch are in the first state, the positive output end and the negative output end of the first DC/DC circuit are respectively connected to the direct current positive bus and the neutral bus, and the positive output end and the negative output end of the second DC/DC circuit are respectively connected to the neutral bus and the direct current negative bus. When all of the first single-pole double-throw switch, the second single-pole double-throw switch, the third single-pole double-throw switch, and the fourth single-pole double-throw switch are in the second state, the positive output end and the negative output end of the first DC/DC circuit are respectively connected to the neutral bus and the direct current negative bus, and the positive output end and the negative output end of the second DC/DC circuit are respectively connected to the direct current positive bus and the neutral bus.

In a possible implementation, the first group of switches includes a first switch, a second switch, a third switch, and a fourth switch, and the second group of switches includes a fifth switch, a sixth switch, a seventh switch, and an eighth switch. Both a first end of the first switch and a first end of the second switch are connected to a positive output end of the first DC/DC circuit, and a second end of the first switch and a second end of the second switch are respectively connected to a positive input end of the first inverter circuit and a positive input end of the second inverter circuit. Both a first end of the third switch and a first end of the fourth switch are connected to a negative output end of the first DC/DC circuit, and a second end of the third switch and a second end of the fourth switch are respectively connected to a negative input end of the first inverter circuit and a negative input end of the second inverter circuit. Both a first end of the fifth switch and a first end of the sixth switch are connected to a positive output end of the second DC/DC circuit, and a second end of the fifth switch and a second end of the sixth switch are respectively connected to the positive input end of the second inverter circuit and the positive input end of the first inverter circuit. Both a first end of the seventh switch and a first end of the eighth switch are connected to a negative output end of the second DC/DC circuit, and a second end of the seventh switch and a second end of the eighth switch are respectively connected to the negative input end of the second inverter circuit and the negative input end of the first inverter circuit. The negative input end of the first inverter circuit is connected to the positive input end of the second inverter circuit. When all of the first switch, the third switch, the fifth switch, and the seventh switch are in the first state, and all of the second switch, the fourth switch, the sixth switch, and the eighth switch are in the second state, the positive output end and the negative output end of the first DC/DC circuit are respectively connected to the direct current positive bus and the neutral bus, and the positive output end and the negative output end of the second DC/DC circuit are respectively connected to the neutral bus and the direct current negative bus. When all of the first switch, the third switch, the fifth switch, and the seventh switch are in the second state, and all of the second switch, the fourth switch, the sixth switch, and the eighth switch are in the first state, the positive output end and the negative output end of the first DC/DC circuit are respectively connected to the neutral bus and the direct current negative bus, and the positive output end and the negative output end of the second DC/DC circuit are respectively connected to the direct current positive bus and the neutral bus.

The foregoing describes the photovoltaic system. The following describes a widely applicable power supply system. The power supply system is also a bipolar power supply system, including a positive potential and a negative potential, for example, may be a wind power generation system, a hydropower generation system, or an energy storage system. For advantages of the following power supply system solutions, refer to the foregoing advantages of the photovoltaic system. Details are not described herein again.

The power supply system may include a first inverter circuit, a second inverter circuit, and a switch circuit. The power supply system is different from a conventional unipolar power supply system. The power supply system includes three direct current buses, including a positive potential and a negative potential. A first input end and a second input end of the first inverter circuit are respectively connected to a direct current positive bus and a neutral bus, and a first input end and a second input end of the second inverter circuit are respectively connected to the neutral bus and a direct current negative bus. The switch circuit includes a first state and a second state. When the switch circuit is in the first state, a first direct current power supply is connected to the direct current positive bus and the neutral bus through the switch circuit, and a second direct current power supply is connected to the neutral bus and the direct current negative bus through the switch circuit. When the switch circuit is in the second state, the first direct current power supply is connected to the neutral bus and the direct current negative bus through the switch circuit, and the second direct current power supply is connected to the direct current positive bus and the neutral bus through the switch circuit.

The switch circuit is added to the system, so that a potential of an input source can be switched, that is, the potential of the input source can be controlled to change, that is, potentials corresponding to two input sources can be switched. For example, the first direct current power supply is sometimes at a positive potential, and sometimes at a negative potential. The first direct current power supply is not operated at a negative potential for a long time, so that a service life of the first direct current power supply is prolonged. The input power source is a direct current power supply of the system. According to the control method, a switch action may be first controlled, and then each component in the system is started; or each component in the system may be first started, and then a switch action is controlled.

In a possible implementation, the switch circuit includes a first group of switches and a second group of switches. Both the first group of switches and the second group of switches include the first state and the second state. When both the first group of switches and the second group of switches are in the first state, the first direct current power supply is connected to the direct current positive bus and the neutral bus through the switch circuit, and the second direct current power supply is connected to the neutral bus and the direct current negative bus through the switch circuit. When both the first group of switches and the second group of switches are in the second state, the first direct current power supply is connected to the neutral bus and the direct current negative bus through the switch circuit, and the second direct current power supply is connected to the direct current positive bus and the neutral bus through the switch circuit.

In a possible implementation, the power supply system further includes a direct current/direct current DC/DC converter. An input end of the DC/DC converter is connected to the first direct current power supply and the second direct current power supply, and an output end of the DC/DC converter is connected to the direct current positive bus, the neutral bus, and the direct current negative bus.

In a possible implementation, both the first direct current power supply and the second direct current power supply are connected to the input end of the DC/DC converter through the switch circuit.

In a possible implementation, the DC/DC converter includes a first DC/DC circuit and a second DC/DC circuit. The switch circuit includes a first group of switches and a second group of switches. Both the first group of switches and the second group of switches include the first state and the second state. A positive output end and a negative output end of the first DC/DC circuit are respectively connected to the direct current positive bus and the neutral bus, and a positive output end and a negative output end of the second DC/DC circuit are respectively connected to the neutral bus and the direct current negative bus. An output end of the first direct current power supply is connected to the first group of switches, and an output end of the second direct current power supply is connected to the second group of switches. When both the first group of switches and the second group of switches are in the first state, the first direct current power supply is connected to the first DC/DC circuit through the first group of switches, and the second direct current power supply is connected to the second DC/DC circuit through the second group of switches. When both the first group of switches and the second group of switches are in the second state, the second direct current power supply is connected to the first DC/DC circuit through the second group of switches, and the first direct current power supply is connected to the second DC/DC circuit through the first group of switches.

In a possible implementation, the output end of the DC/DC converter is connected to the direct current positive bus, the neutral bus, and the direct current negative bus through the switch circuit.

In a possible implementation, the DC/DC converter includes a first DC/DC circuit and a second DC/DC circuit. The switch circuit includes a first group of switches and a second group of switches. Both the first group of switches and the second group of switches include the first state and the second state. An output end of the first direct current power supply is connected to an input end of the first DC/DC circuit, and an output end of the first DC/DC circuit is connected to the first group of switches. An output end of the second direct current power supply is connected to an input end of the second DC/DC circuit, and an output end of the second DC/DC circuit is connected to the second group of switches. When both the first group of switches and the second group of switches are in the first state, the first DC/DC circuit is connected to the direct current positive bus and the neutral bus, and the second DC/DC circuit is connected to the neutral bus and the direct current negative bus. When both the first group of switches and the second group of switches are in the second state, the first DC/DC circuit is connected to the neutral bus and the direct current negative bus, and the second DC/DC circuit is connected to the direct current positive bus and the neutral bus.

In a possible implementation, the switch circuit includes a plurality of single-pole double-throw switches.

The embodiments may have the following advantages:

The photovoltaic system is different from a conventional unipolar photovoltaic system. Compared with the unipolar photovoltaic system, the photovoltaic system includes a neutral point. Therefore, compared with a unipolar photovoltaic system with a same voltage level, the architecture can reduce a safety voltage requirement, reduce a withstand voltage of a power device, and facilitate type selection of the power device. In addition, the bipolar photovoltaic system includes a switch circuit, two photovoltaic arrays, and two inverter circuits. The switch circuit may be connected between the two photovoltaic arrays and the two inverter circuits. Because an input end of the inverter circuit is a direct current bus, the switch circuit is connected between the two photovoltaic arrays and the three direct current buses. When the photovoltaic array operates at a potential for a long time, such as at a negative potential for a long time, a PID effect is likely to occur, causing a power decrease, and affecting power generation efficiency and a service life of the photovoltaic array. The switch circuit may enable the photovoltaic array to be at different potentials, that is, may switch connection relationships between the photovoltaic array and the direct current buses. That is, when the switch circuit is in the first state, the first photovoltaic array is connected to the direct current positive bus and the neutral bus, and the second photovoltaic array is connected to the direct current negative bus and the neutral bus. When the switch circuit is in the second state, the connection potential of the photovoltaic array changes. In other words, the first photovoltaic array is connected to the direct current negative bus and the neutral bus, and the second photovoltaic array is connected to the direct current positive bus and the neutral bus. In this way, a potential of the photovoltaic array is changed, and a case in which the photovoltaic array is at a fixed potential for a long time is avoided, and a PID effect is more likely to occur such as when the photovoltaic array is at a negative potential for a long time. Therefore, the embodiments may suppress the PID effect of the photovoltaic array and prolong a service life of a photovoltaic module in the photovoltaic array.

DETAILED DESCRIPTION OF THE EMBODIMENTS

The following terms "first", "second", and the like are merely intended for a purpose of description and shall not be understood as an indication or implication of relative importance or implicit indication of a quantity of indicated features. Therefore, a feature limited by "first" or "second" may explicitly or implicitly include one or more features. In the descriptions, unless otherwise stated, "a plurality of" means two or more than two.

In addition, orientation terms such as "up" and "down" may include, but are not limited to, orientations of components schematically placed in accompanying drawings. It should be understood that these orientation terms may be relative concepts. The orientation terms are used for relative description and clarification and may vary correspondingly based on a change in an orientation in which the component is placed in the accompanying drawings.

The term "connection" should be understood in a broad sense. For example, the "connection" may be a fixed connection, a detachable connection, an integration, a direct connection, or an indirect connection through an intermediate medium. In addition, a term "coupling" may be a manner of implementing an electrical connection for signal transmission. The "coupling" may be a direct electrical connection or may be an indirect electrical connection through an intermediate medium.

To enable persons skilled in the art to better understand that the solutions provided in the embodiments are applicable to a bipolar system, a type of the bipolar system is not limited in the embodiments. For example, the bipolar system may be a bipolar photovoltaic system, or may be a bipolar wind power system, a bipolar hydropower system, or a bipolar energy storage system. To enable persons skilled in the art to better understand the bipolar system provided in the embodiments, the following first uses a bipolar photovoltaic system as an example for description.

Photovoltaic System Embodiment

Figure 1:
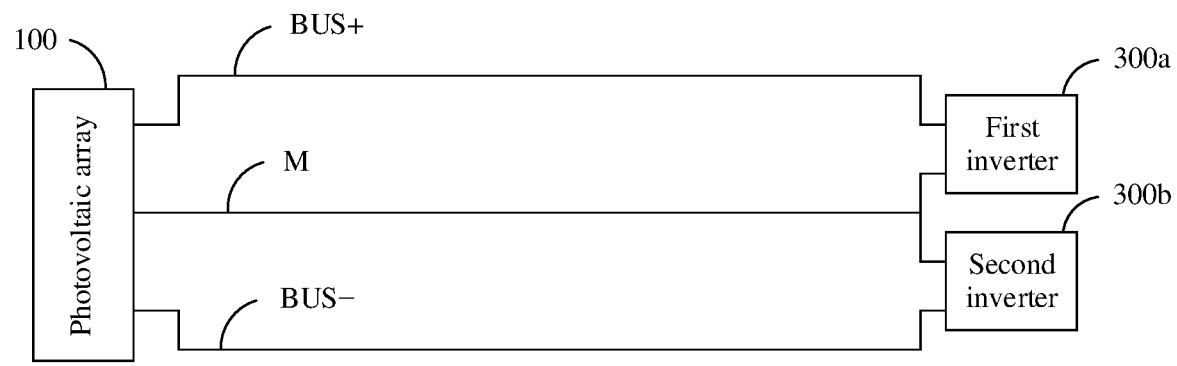
FIG. 1 is a schematic diagram of a photovoltaic system according to an embodiment.

FIG. 1 is a schematic diagram of a photovoltaic system according to an embodiment.

A photovoltaic system in embodiments may be a bipolar photovoltaic system, including a photovoltaic array and two inverters, and may further include a DC/DC circuit. The following first uses a bipolar photovoltaic system that does not include a DC/DC circuit as an example for description.

A difference between the bipolar photovoltaic system provided in the embodiments and a conventional unipolar photovoltaic system is as follows: The bipolar photovoltaic system includes three buses: a direct current positive bus BUS+, a neutral bus M, and a direct current negative bus BUS−. It should be understood that the neutral bus M may be an actually existing line or may be a relatively existing reference potential. A neutral point on one side of a photovoltaic array 100 may not be connected to a neutral point on an inverter side, provided that potentials of the neutral points on the two sides are in consistency. The consistency means that the potentials may be the same, or the potentials may be within a preset voltage range. For example, when a potential of a neutral point of an inverter to ground is less than 100V, a potential of a neutral point of a power converter to ground is less than 100V. When the neutral point on the side of the photovoltaic array 100 is connected to the neutral point on the inverter side, a neutral bus M exists. For ease of understanding, the following embodiments each are described by using an example in which the neutral bus M is an open line.

The conventional unipolar photovoltaic system includes only two direct current buses: BUS+ and BUS−.

As shown in FIG. 1, three direct current buses: BUS+, M, and BUS− may be directly connected to the photovoltaic array 100. The photovoltaic array 100 outputs three voltages with different potentials.

A first input end of a first inverter 300a is connected to a second end of the direct current positive bus BUS+, and a second input end of the first inverter 300a is connected to a second end of the neutral bus M.

A first input end of a second inverter 300b is connected to the second end of the neutral bus M, and a second input end of the second inverter 300b is connected to a second end of the direct current negative bus BUS−. The second input end of the first inverter 300a may be connected to the first input end of the second inverter 300b. The first input end of the first inverter 300a may be a positive input end, and the second input end of the first inverter 300a may be a negative input end. Similarly, the first input end of the second inverter 300b may be a positive input end, and the second input end of the second inverter 300b may be a negative input end.

For example, when a voltage of BUS+ is +1500V, and a voltage of BUS− is −1500V, a voltage level of the bipolar photovoltaic system is +1500V or −1500V. However, a total direct current bus voltage existing after BUS+ and BUS− are connected in series is 3000V. Therefore, the bipolar photovoltaic system provided in this embodiment is applicable to 1500V of safety regulation, and the total direct current bus voltage of 3000V may reduce a safety regulation voltage to 1500V, thereby reducing a withstand voltage requirement for a power converter and a power tube in an inverter. For example, for the first inverter 300a and the second inverter 300b, both voltage levels of the input ends of the first inverter 300a and the second inverter 300b are 1500V, an input voltage of the first inverter 300a is between a voltage of the neutral bus and a voltage of BUS+, and an input voltage of the second inverter 300b is between a voltage of BUS− and the voltage of the neutral bus.

Generally, a potential of the neutral bus M is basically equal to a ground potential. For example, when a potential of M is equal to a ground potential, the input voltage of the first inverter 300a is in a range of 0V to 1500V (including 0V and +1500V), and the input voltage of the second inverter 300b is in a range of −1500V to 0V (including −1500V and 0V). It should be understood that a potential of M may alternatively be not equal to the ground potential.

According to the bipolar photovoltaic system provided in the embodiments, a withstand voltage level of a power tube inside the bipolar photovoltaic system is lower than a conventional input voltage of 3000V. The bipolar photovoltaic system provided in the embodiments can effectively reduce a voltage level of a power device without reducing a total bus voltage. This facilitates type selection of the power device.

In the bipolar photovoltaic system mentioned above, the photovoltaic array connected to the neutral bus and the direct current negative bus corresponds to a negative potential. Different from a unipolar photovoltaic system, in the bipolar photovoltaic system, most photovoltaic arrays are above a ground potential, that is, are at a positive potential. For a photovoltaic array at a negative potential, when the photovoltaic array operates at the negative potential for a long time, a PID effect is likely to occur, causing a power decrease, and affecting power generation efficiency and a service life of the photovoltaic array. Therefore, to resolve the foregoing problem, in the embodiments, a switch circuit is disposed in a photovoltaic system, to switch connection relationships between a photovoltaic array and direct current buses, so as to change a potential corresponding to the photovoltaic array and prevent the photovoltaic array from being at the negative potential for a long time. In this way, a PID effect of the photovoltaic array is suppressed, so that a fill factor, a short-circuit current Isc of a photovoltaic module, and an open-circuit voltage Voc of the photovoltaic module are not reduced. With reference to the accompanying drawings, the following describes in detail an implementation of PID suppression in a bipolar photovoltaic system provided in the embodiments.

Figure 2:
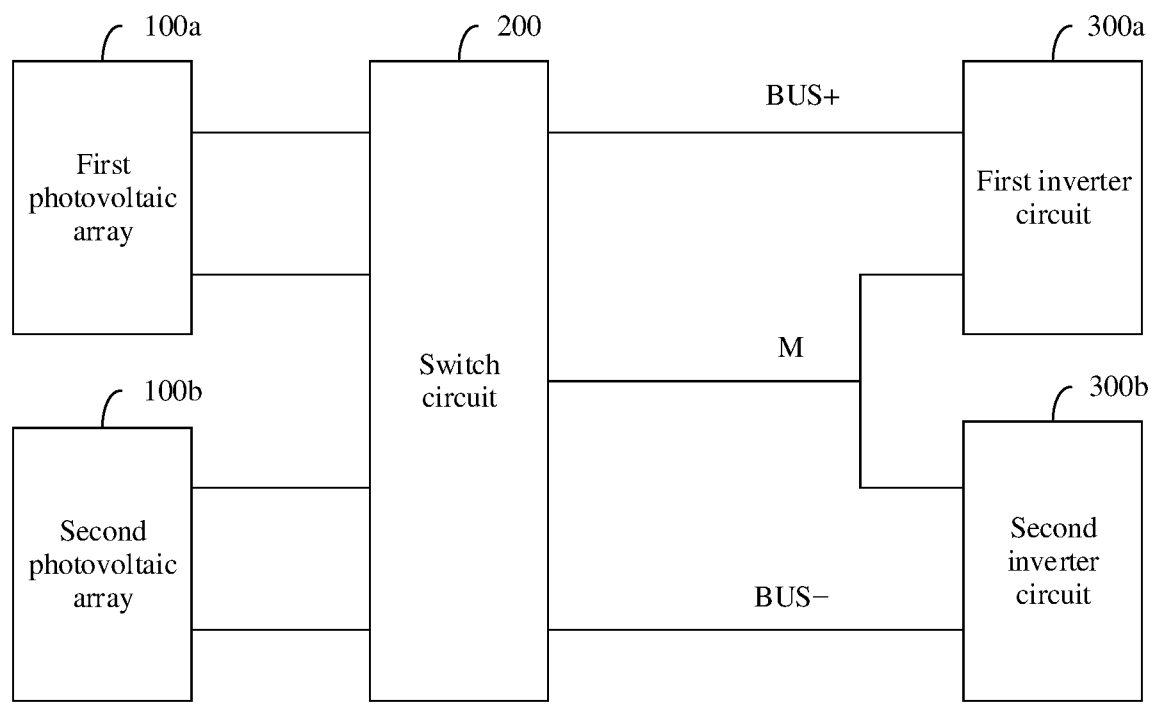
FIG. 2 is a schematic diagram of another photovoltaic system according to an embodiment.

FIG. 2 is a schematic diagram of a photovoltaic system according to an embodiment.

The photovoltaic system provided in this embodiment includes a first inverter circuit 300a, a second inverter circuit 300b, and a switch circuit 200.

In addition, the photovoltaic system may further include a first photovoltaic array 100a and a second photovoltaic array 100b.

A first input end and a second input end of the first inverter circuit 300a are respectively connected to a direct current positive bus BUS+ and a neutral bus M. A first input end and a second input end of the second inverter circuit 300b are respectively connected to the neutral bus M and a direct current negative bus BUS−.

The switch circuit 200 includes a first state and a second state. An implementation of the switch circuit 200 is not limited in the embodiments. For example, the switch circuit 200 may be a plurality of independent switches, or may be a multi-path selection switch, or may be a single-pole double-throw switch.

The first state and the second state are two different states of the switch circuit 200. If the switch circuit 200 is a plurality of independent switches, the first state and the second state respectively correspond to a closed state and an open state. If the switch circuit 200 is a single-pole double-throw switch, the first state and the second state may be states in which a movable contact of the single-pole double-throw switch is in contact with a first stationary contact and a second stationary contact respectively.

When the switch circuit 200 is in the first state, the first photovoltaic array 100a is connected to the direct current positive bus BUS+ and the neutral bus M through the switch circuit, and the second photovoltaic array 100b is connected to the neutral bus M and the direct current negative bus BUS− through the switch circuit. When the switch circuit 200 is in the first state, the switch circuit 200 may connect the first photovoltaic array 100a to the input ends of the first inverter circuit 300a and may connect the second photovoltaic array 100b to the input ends of the second inverter circuit 300b.

For example, BUS+ is 1500V, M is 0V, and BUS− is −1500V. When the first photovoltaic array 100a is connected to BUS+ and M, and the second photovoltaic array 100b is connected to M and BUS−, a voltage corresponding to the first photovoltaic array 100a is in a range of 0V to 1500V (including 0V and +1500V), and a voltage corresponding to the second photovoltaic array 100b is in a range of −1500V to 0V (including −1500V and 0V). When the switch circuit is in the first state, the first photovoltaic array 100a may correspond to a positive potential and the second photovoltaic array 100b may correspond to a negative potential.

When the switch circuit 200 is in the second state, the first photovoltaic array 100a is connected to the neutral bus and the direct current negative bus through the switch circuit, and the second photovoltaic array 100b is connected to the direct current positive bus BUS+ and the neutral bus M through the switch circuit 200. When the switch circuit 200 is in the second state, the switch circuit 200 may connect the first photovoltaic array 100a to the input ends of the second inverter circuit 300b and may connect the second photovoltaic array 100b to the input ends of the first inverter circuit 300a.

When the first photovoltaic array 100a is connected to M and BUS-, and the second photovoltaic array 100b is connected to BUS+ and M, a voltage corresponding to the first photovoltaic array 100a is in the range of -1500V to 0V (including -1500V and 0V), and a voltage corresponding to the second photovoltaic array 100b is in the range of 0V to 1500V (including 0V and +1500V). When the switch circuit is in the second state, the first photovoltaic array 100a may corresponds to a negative potential and the second photovoltaic array 100b may correspond to a positive potential.

It can be understood that when the switch circuit 200 switches from the first state to the second state, a potential corresponding to the first photovoltaic array 100a changes, and a potential corresponding to the second photovoltaic array 100b also changes, to prevent one of the photovoltaic arrays from operating at a negative potential for a long time. In this way, a PID effect of the photovoltaic array is suppressed, and a service life of the photovoltaic array is prolonged.

For example, a switch state of the switch circuit 200 may be controlled by a controller, and the controller may switch the state of the switch circuit by a preset cycle. For example, the preset cycle may be one cycle or two cycles. A time length of the preset cycle is not limited in embodiments and may be set based on an actual requirement. In an initial state, the first photovoltaic array 100a corresponds to a positive potential, and the second photovoltaic array 100b corresponds to a negative potential. Because the second photovoltaic array 100b corresponds to the negative potential, a PID effect may occur in the second photovoltaic array 100b. This affects power generation efficiency of the second photovoltaic array 100b.

An example in which the preset cycle is one cycle is used for description. After one cycle, to suppress the PID effect of the second photovoltaic array 100b, the controller switches the state of the switch circuit 200 from the first state to the second state. In this case, the first photovoltaic array 100a corresponds to a negative potential (-1500V to 0V), and the second photovoltaic array 100b corresponds to a positive potential (0V to 1500V), so that the PID effect of the second photovoltaic array 100b can be suppressed.

Because a PID effect may occur in a photovoltaic array operating at a negative potential, when the switch circuit 200 is in the second state, the first photovoltaic array 100a corresponds to the negative potential (-1500V to 0V), and a PID effect also occurs. To suppress the PID effect of the first photovoltaic array 100a, after the first photovoltaic array 100a operates at the negative potential (-1500V to 0V) for one preset cycle, the controller switches the switch circuit 200 back to the first state, to suppress the PID effect of the first photovoltaic array 100a.

Therefore, the controller may switch the state of the switch circuit 200 by the preset cycle, that is, switch from the first state to the second state, and then switch from the second state to the first state after each preset cycle. This is performed in circulation.

In order that power generation of the photovoltaic system is not affected when the switch circuit 200 performs state switching, the switch circuit 200 may perform switching at night, that is, perform state switching when the photovoltaic array does not output a direct current. For example, the switch circuit 200 is switched from the first state to the second state at night, and the photovoltaic array starts to generate electricity when there is sunlight in the daytime on the next day. In this case, the first photovoltaic array 100a corresponds to a negative potential, and the second photovoltaic array 100b corresponds to a positive potential, to implement potential switching and perform normal power generation work.

A location of the controller is not limited in embodiments. Because control of the switch circuit 200 is independent of control of another component in the photovoltaic system, the controller may be independently disposed, or may be considered by a controller of another component.

The switch circuit provided in embodiments may be connected between two photovoltaic arrays and a direct current bus, that is, the switch circuit is directly or indirectly connected between two direct current power supplies and a direct current bus. For example, the switch circuit may be connected between the two photovoltaic arrays and the two inverter circuits, and the switch circuit implements connection relationships between the two photovoltaic arrays and the two inverter circuits. When the system includes a direct current/direct current converter, the switch circuit is alternatively connected between the photovoltaic array and the direct current/direct current converter, or the switch circuit is connected between the direct current/direct current converter and the inverter circuit, and is configured to switch connection relationships between the two photovoltaic arrays and the direct current/direct current converter. The photovoltaic system is a bipolar system and includes a negative potential, and a PID effect is more likely to occur. Therefore, to suppress the PID effect, direct or indirect connection relationships between a photovoltaic array and direct current buses may be switched through the switch circuit, to change potentials corresponding to the two photovoltaic arrays, suppress a PID effect of the photovoltaic array, and prolong a service life of a photovoltaic module in the photovoltaic array. According to the photovoltaic system provided in the embodiments, a potential corresponding to a photovoltaic array is changed only by switching the state of the switch circuit, and there is no need to introduce another new power supply to raise the potential of the photovoltaic array, to suppress a PID effect. This solution has low costs, is easy to control, and is easy to implement.

An action occasion of the switch circuit 200 is not limited in the embodiments. In the foregoing example, the switch circuit 200 may automatically implement switching, for example, may be a controllable switch. The bipolar photovoltaic system provided in the embodiments may further include a controller, and the controller controls state switching of the switch circuit 200. The controller may switch the state of the switch circuit by a preset cycle in a timing manner. In another implementation, the state may alternatively be manually switched, and may be switched in a timing manner or may not be switched in a timing manner. This is not limited in the embodiments.

To enable the switch circuit to be in a one-to-one correspondence with the two photovoltaic arrays, and better complete potential switching of the two photovoltaic arrays, the switch circuit may include two groups of switches. The following describes an implementation in which the switch circuit includes the two groups of switches.

Figure 3:
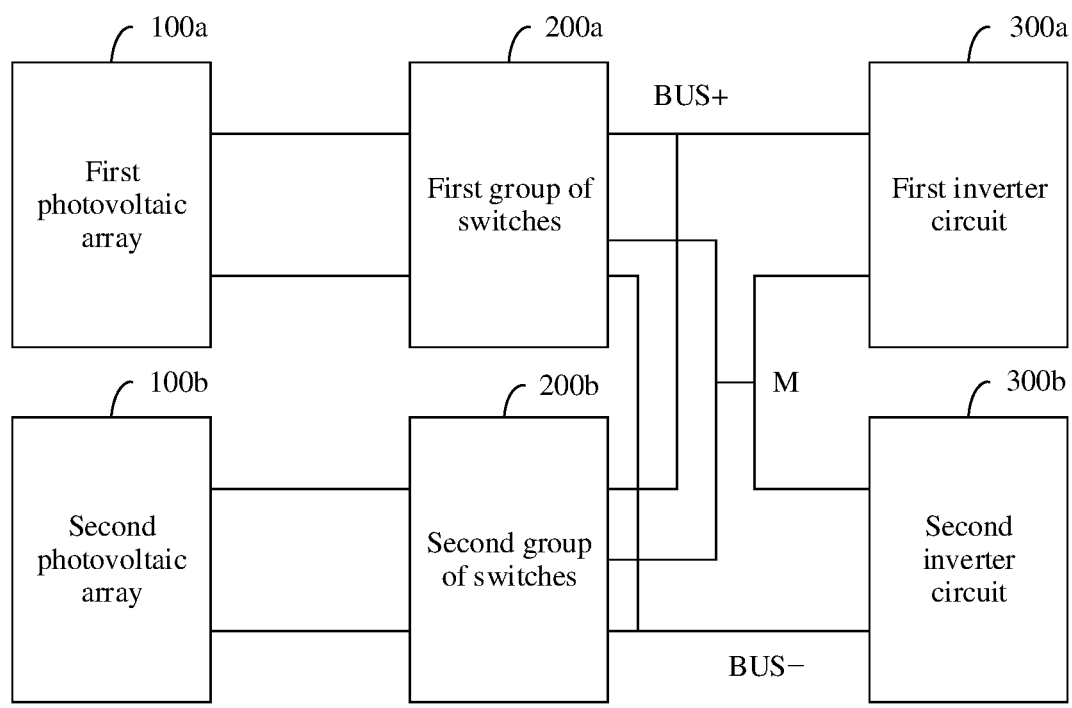
FIG. 3 is a schematic diagram of still another photovoltaic system according to an embodiment.

FIG. 3 is a schematic diagram of still another bipolar photovoltaic system according to an embodiment.

The switch circuit includes a first group of switches 200a and a second group of switches 200b. The first group of switches 200a and the second group of switches 200b operate simultaneously, and states of the two groups of switches are complementary, that is, the two groups of switches are not in a same state at the same time.

The first photovoltaic array 100a corresponds to the first group of switches 200a, that is, the first group of switches 200a is configured to switch connection relationship s between the first photovoltaic array 100a and the two inverter circuits. An input end of the first group of switches 200a is connected to the first photovoltaic array 100a, and an output end of the first group of switches 200a is connected to both the first inverter 300a and the second inverter 300b.

The second photovoltaic array 100b corresponds to the second group of switches 200b, that is, the second group of switches 200b is configured to switch connection relationships between the second photovoltaic array 100b and the two inverters. An input end of the second group of switches 200b is connected to the second photovoltaic array 100b, and an output end of the second group of switches 200b is connected to both the first inverter 300a and the second inverter 300b.

Both the first group of switches 200a and the second group of switches 200b include a first state and a second state.

When both the first group of switches 200a and the second group of switches 200b are in the first state, the first photovoltaic array 100a is connected to the direct current positive bus BUS+ and the neutral bus M through the first group of switches 200a, and the second photovoltaic array 100b is connected to the neutral bus M and the direct current negative bus BUS– through the second group of switches 200b. The first photovoltaic array 100a may correspond to a positive potential and the second photovoltaic array 100b may correspond to a negative potential.

When both the first group of switches 200a and the second group of switches 200b are in the second state, the first photovoltaic array 100a is connected to the neutral bus M and the direct current negative bus BUS– through the first group of switches 200a, and the second photovoltaic array 100b is connected to the direct current positive bus BUS+ and the neutral bus M through the second group of switches 200b. The first photovoltaic array 100a may correspond to a negative potential and the second photovoltaic array 100b may correspond to a positive potential.

In the embodiments, an implementation of the first group of switches 200a and the second group of switches 200b is not limited, and a physical position relationship is not limited. For example, the first group of switches 200a and the second group of switches 200b may be encapsulated in one housing. When a controller is included, the controller may be encapsulated with the first group of switches 200a and the second group of switches 200b. The first group of switches 200a and the second group of switches 200b may alternatively exist independently, that is, the first group of switches 200a and the second group of switches 200b each have an independent housing.

It can be understood that, when the first group of switches 200a and the second group of switches 200b switch from the first state to the second state, a potential corresponding to the first photovoltaic array 100a changes, and a potential corresponding to the second photovoltaic array 100b also changes, to prevent one of the photovoltaic arrays from operating at a negative potential for a long time. In this way, a PID effect of the photovoltaic array operating at the negative potential is suppressed, and a service life of the photovoltaic array is prolonged.

For example, switch states of the first group of switches 200a and the second group of switches 200b may be controlled by the controller, and the controller may switch a state of the switch circuit by a preset cycle. For example, the preset cycle may be one cycle or two cycles. A time length of the preset cycle is not limited in the embodiments, and may be set based on an actual requirement. In an initial state, the first photovoltaic array 100a corresponds to a positive potential, and the second photovoltaic array 100b corresponds to a negative potential. Because the second photovoltaic array 100b corresponds to the negative potential, a PID effect may occur in the second photovoltaic array 100b. This affects power generation efficiency of the second photovoltaic array 100b.

The following describes two implementations of the first group of switches 200a and the second group of switches 200b. First, a first implementation is described in which both the first group of switches 200a and the second group of switches 200b are implemented by using single-pole double-throw switches.

Figure 4:
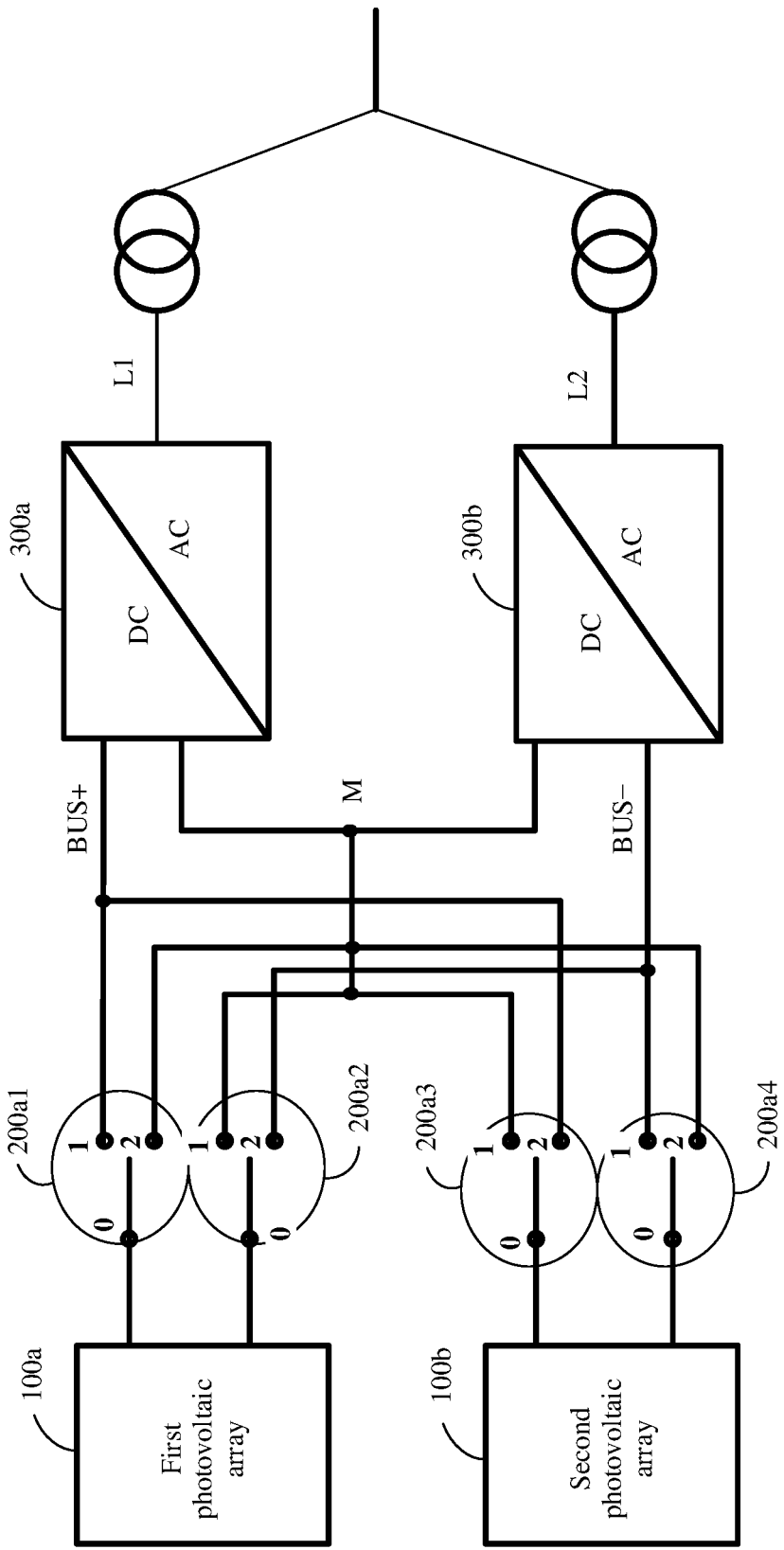
FIG. 4 is a schematic diagram of yet another photovoltaic system according to an embodiment.

FIG. 4 is a schematic diagram of yet another bipolar photovoltaic system according to an embodiment.

The following uses an example in which the switch circuit includes a single-pole double-throw switch for description. The switch circuit includes four single-pole double-throw switches, which are respectively: the first group of switches includes a first single-pole double-throw switch 200a1 and a second single-pole double-throw switch 200a2, and the second group of switches includes a third single-pole double-throw switch 200a3 and a fourth single-pole double-throw switch 200a4.

The four single-pole double-throw switches may be integrated in one housing. When a controller is included, the controller and the four single-pole double-throw switches may be integrated in one housing. Alternatively, the four single-pole double-throw switches may be disposed independently or may be integrated in one housing in pairs. For example, when two single-pole double-throw switches are integrated in one housing, the first single-pole double-throw switch 200a1 and the second single-pole double-throw switch 200a2 are integrated in one housing, the third single-pole double-throw switch 200a3 and the fourth single-pole double-throw switch 200a4 are integrated in one housing.

As shown in FIG. 4, each single-pole double-throw switch has three contacts, including one movable contact and two stationary contacts. The movable contact is in contact with the first stationary contact in a first state, and the movable contact is in contact with the second stationary contact in a second state. The following uses an example in which actions of all single-pole double-throw switches are consistent. For all of the four single-pole double-throw switches, in the first state, movable contacts may be in contact with first stationary contacts, and in the second state, the movable contacts may be in contact with second stationary contacts.

A movable contact 0 of the first single-pole double-throw switch 200a1 is connected to a positive output end of the first photovoltaic array 100a, and a first stationary contact 1 and a second stationary contact 2 of the first single-pole double-throw switch 200a1 are respectively connected to the direct current positive bus BUS+ and the neutral bus M. A movable contact 0 of the second single-pole double-throw switch 200a2 is connected to a negative output end of the first photovoltaic array 100a, and a first stationary contact 1 and a second stationary contact 2 of the second single-pole double-throw switch 200a2 are respectively connected to the neutral bus M and the direct current negative bus BUS–. A movable contact 0 of the third single-pole double-throw switch 200a3 is connected to a positive output end of the second photovoltaic array 100b, and a first stationary contact 1 and a second stationary contact 2 of the third single-pole double-throw switch 200a3 are respectively connected to the neutral bus M and the direct current positive bus BUS+. A movable contact 0 of the fourth single-pole double-throw switch 200a4 is connected to a negative output end of the second photovoltaic array 100b, and a first stationary contact 1 and a second stationary contact 2 of the fourth single-pole double-throw switch 200a4 are respectively connected to the direct current negative bus BUS− and the neutral bus M.

When all of the first single-pole double-throw switch 200a1, the second single-pole double-throw switch 200a2, the third single-pole double-throw switch 200a3, and the fourth single-pole double-throw switch 200a4 are in the first state, the positive output end and the negative output end of the first photovoltaic array 100a are respectively connected to the direct current positive bus BUS+ and the neutral bus M, and the positive output end and the negative output end of the second photovoltaic array 100b are respectively connected to the neutral bus M and the direct current negative bus BUS−. When all of the four single-pole double-throw switches are in the first state, the first photovoltaic array 100a may be connected to an input end of a first inverter DC/AC circuit 300a and the second photovoltaic array 100b may be connected to an input end of a second inverter DC/AC circuit 300b.

When all of the first single-pole double-throw switch 200a1, the second single-pole double-throw switch 200a2, the third single-pole double-throw switch 200a3, and the fourth single-pole double-throw switch 200a4 are in the second state, the positive output end and the negative output end of the first photovoltaic array 100a are respectively connected to the neutral bus M and the direct current negative bus BUS−, and the positive output end and the negative output end of the second photovoltaic array 100b are respectively connected to the direct current positive bus BUS+ and the neutral bus M. When all of the four single-pole double-throw switches are in the second state, the first photovoltaic array 100a may be connected to the input end of the second inverter DC/AC circuit 300b and the second photovoltaic array 100b may be connected to the input end of the first inverter DC/AC circuit 300a.

It can be understood that when the four single-pole double-throw switches are separately in the first state and the second state, the first photovoltaic array 100a and the second photovoltaic array 100b are connected to different inverter circuits. Because input ends of the two inverter circuits correspond to different direct current buses, potentials of the corresponding direct current buses are different. Therefore, when the four single-pole double-throw switches are switched from the first state to the second state or from the second state to the first state, potentials corresponding to the two photovoltaic arrays are exchanged, to prevent one of the photovoltaic arrays from being at a negative potential for a long time. In this way, a PID effect of the photovoltaic array at the negative potential is suppressed, and a service life of a photovoltaic module in the photovoltaic array is prolonged.

The photovoltaic array may include a plurality of photovoltaic strings. The plurality of photovoltaic strings may be connected in parallel to form a photovoltaic array. A quantity of photovoltaic strings included in the photovoltaic array is not limited in the embodiments.

The foregoing describes the example in which the switch circuit includes the single-pole double-throw switch. The following describes an example in which the switch circuit includes a plurality of independent switches. A bipolar photovoltaic system is used as an example. When switching of corresponding potentials of two photovoltaic arrays is implemented, four single-pole double-throw switches are needed, and the switch circuit includes a plurality of independent switches, eight independent switches are needed. Therefore, compared with the eight independent switches, the four single-pole double-throw switches have a smaller quantity and lower costs. In addition, the switch circuit may occupy less space, the four switches correspond to fewer control signals, and control is relatively simple and easy to implement.

The foregoing describes the example in which the switch circuit includes the single-pole double-throw switch. The following describes an example in which the switch circuit includes independent switches.

Figure 5:
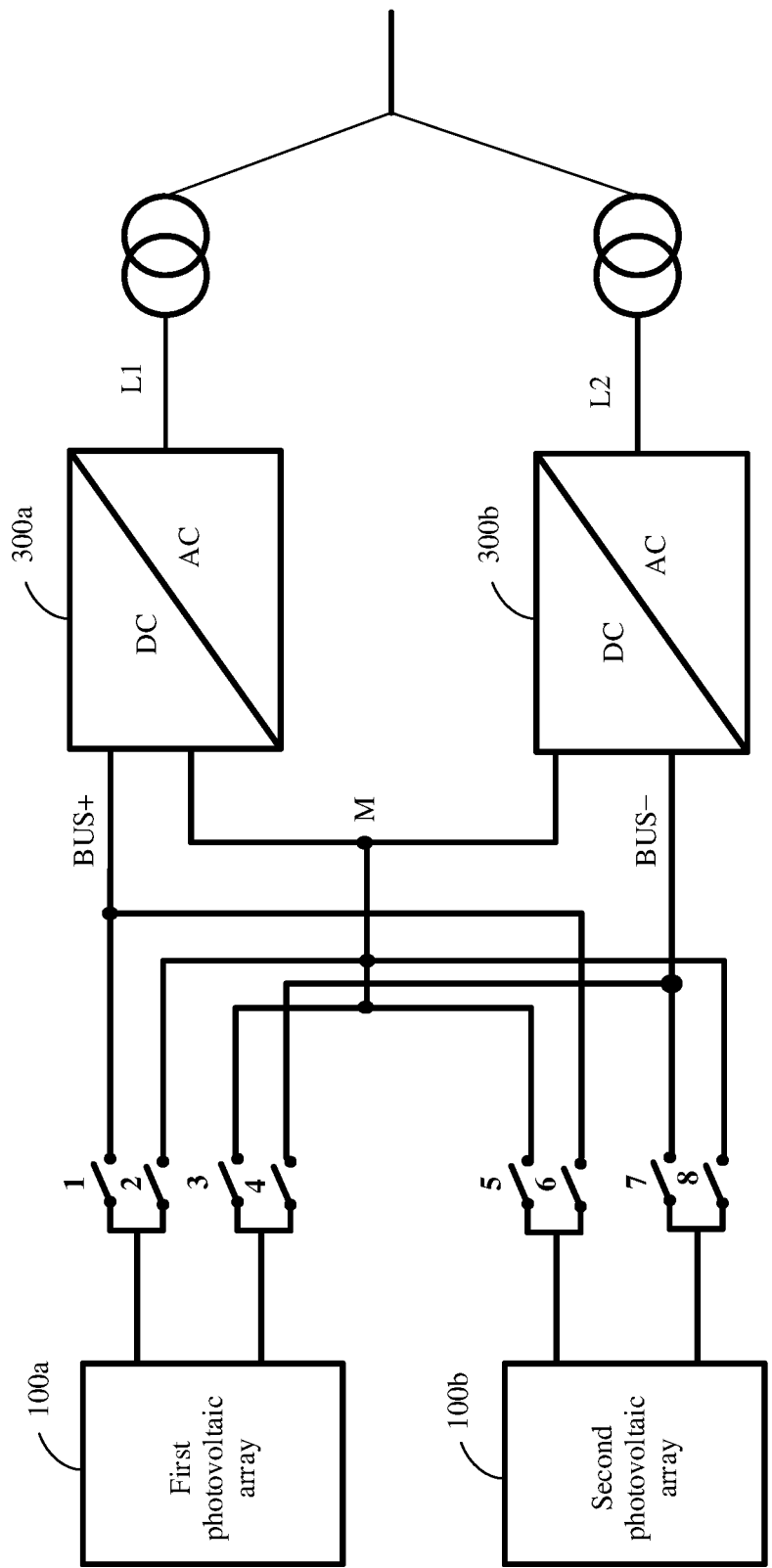
FIG. 5 is a schematic diagram of yet another photovoltaic system according to an embodiment.

FIG. 5 is a schematic diagram of yet another bipolar photovoltaic system according to an embodiment.

The first group of switches includes a first switch 1, a second switch 2, a third switch 3, and a fourth switch 4, and the second group of switches includes a fifth switch 5, a sixth switch 6, a seventh switch 7, and an eighth switch 8.

Both a first end of the first switch 1 and a first end of the second switch 2 are connected to a positive output end of the first photovoltaic array 100a, a second end of the first switch 1 is connected to the direct current positive bus BUS+, and a second end of the second switch 2 is connected to the neutral bus M. Both a first end of the third switch 3 and a first end of the fourth switch 4 are connected to the negative output end of the first photovoltaic array 100a, a second end of the third switch 3 is connected to the neutral bus M, and a second end of the fourth switch 4 is connected to a direct current negative bus BUS−. Both a first end of the fifth switch 5 and a first end of the sixth switch are connected to a positive output end of the second photovoltaic array 100b, a second end of the fifth switch 5 is connected to the neutral bus M, and a second end of the sixth switch 6 is connected to the direct current positive bus BUS+. Both a first end of the seventh switch 7 and a first end of the eighth switch 8 are connected to a negative output end of the second photovoltaic array 100b, a second end of the seventh switch 7 is connected to the direct current negative bus BUS−, and a second end of the eighth switch 8 is connected to the neutral bus M.

When all of the first switch 1, the third switch 3, the fifth switch 5, and the seventh switch 7 are in a first state, and all of the second switch 2, the fourth switch 4, the sixth switch 6, and the eighth switch 8 are in a second state, the positive output end and the negative output end of the first photovoltaic array 100a are respectively connected to the direct current positive bus BUS+ and the neutral bus M, and the positive output end and the negative output end of the second photovoltaic array 100b are respectively connected to the neutral bus M and the direct current negative bus BUS−. An example in which the direct current bus voltage is 3000V is still used for description. In this case, the first photovoltaic array 100a corresponds to a positive potential (0V to 1500V), and the second photovoltaic array 100b corresponds to a negative potential (−1500V to 0V).

When the switch circuit includes eight independent switches, the first state corresponds to closing of the switch, and the second state corresponds to opening of the switch. In other words, the first state and the second state are two opposite states. This is different from the single-pole double-throw switch. The first state and the second state of the single-pole double-throw switch respectively refer to contact between the movable contact and the first stationary contact and contact between the movable contact and the second stationary contact. In this case, contact means closing.

It should be noted that, states of the first switch 1 and the second switch 2 are complementary. In other words, when the first switch 1 is closed, the second switch 2 is open, and when the first switch 1 is open, the second switch 2 is closed. Similarly, states of the third switch 3 and the fourth switch 4 are also complementary, states of the fifth switch 5 and the sixth switch are also complementary, and states of the seventh switch 7 and the eighth switch 8 are also complementary.

When all of the first switch 1, the third switch 3, the fifth switch 5, and the seventh switch 7 are in the second state, and all of the second switch 2, the fourth switch 4, the sixth switch 6, and the eighth switch 8 are in the first state, the positive output end and the negative output end of the first photovoltaic array 100a are respectively connected to the neutral bus M and the direct current negative bus BUS−, and the positive output end and the negative output end of the second photovoltaic array 100b are respectively connected to the direct current positive bus BUS+ and the neutral bus M. An example in which the direct current bus voltage is 3000V is still used for description. In this case, the first photovoltaic array 100a corresponds to a negative potential (−1500V to 0V), and the second photovoltaic array 100b corresponds to a positive potential (0V to 1500V). It can be understood that, in this case, switching between corresponding potentials of the first photovoltaic array 100a and the second photovoltaic array 100b is implemented. This prevents the first photovoltaic array 100a from operating at a negative potential for a long time, and operating at a negative potential for a long time is likely to cause a PID effect.

The states of the eight independent switches may be switched by a controller. The controller may switch the states of the eight switches by a preset cycle. For example, the preset cycle may be one cycle or two cycles. A time length of the preset cycle is not limited in the embodiments and may be set based on an actual requirement.

An example in which the preset cycle is one cycle is used for description. After the second photovoltaic array 100b operates at a negative potential for one cycle, to suppress a PID effect of the second photovoltaic array 100b, the controller switches states of the eight switches. In this case, the first photovoltaic array 100a corresponds to a negative potential (−1500V to 0V), and the second photovoltaic array 100b corresponds to a positive potential (0V to 1500V), so that the PID effect of the second photovoltaic array 100b can be suppressed, and this is performed in circulation.

In this embodiment, eight independent switches are used to implement switching of corresponding potentials of two photovoltaic arrays. Because the eight switches are disposed independently, control and actions of the switches are performed independently, so that a reliable action of each switch can be ensured, and bonding between the switches does not occur, thereby ensuring accurate and correct switching of potentials corresponding to the two photovoltaic arrays.

An implementation of the eight switches is not limited in the embodiments. For example, in a feasible implementation, the switch may be a controllable switch such as an insulated gate bipolar transistor (IGBT). The controller may control a switch state of the IGBT, to switch a connection relationship between the photovoltaic array and an inverter circuit. In addition, in a possible implementation, the foregoing eight switches may alternatively be manual button switches, and the first state and the second state are manually switched.

The photovoltaic system described in the foregoing embodiments may not include a DC/DC converter. The following uses an example in which the photovoltaic system includes a DC/DC converter for description. When the photovoltaic system includes the DC/DC converter, the switch circuit may connect the photovoltaic array to the DC/DC converter or may connect the DC/DC converter to the inverter circuit. The following separately provides detailed descriptions with reference to the accompanying drawings. It should be understood that implementations and advantages of the switch circuit described in the foregoing embodiments are also applicable to the following embodiments. Details are not described herein again.

First, an implementation in which the switch circuit is located between the DC/DC converter and the inverter circuit is introduced.

Figure 6:
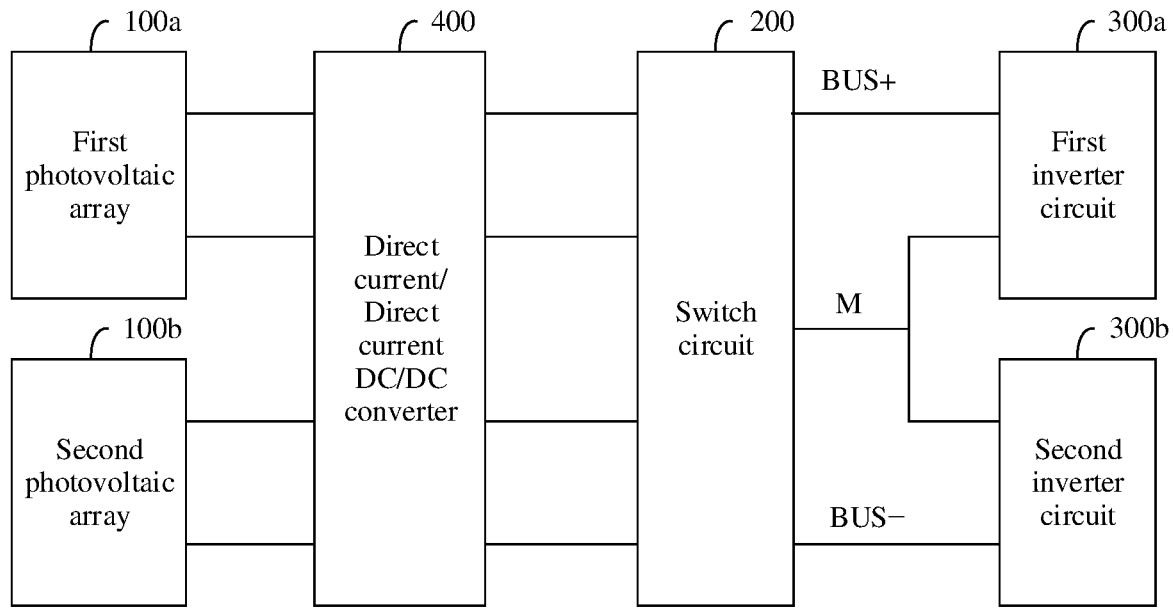
FIG. 6 is a schematic diagram of another photovoltaic system according to an embodiment.

FIG. 6 is a schematic diagram of another bipolar photovoltaic system according to an embodiment.

An output end of a DC/DC converter 400 is connected to the direct current positive bus BUS+, the neutral bus M, and the direct current negative bus BUS− through the switch circuit 200.

An implementation of the DC/DC converter 400 is not limited in the embodiments. For example, the DC/DC converter 400 may be a boost circuit, a buck circuit, or a boost/buck circuit.

Figure 7:
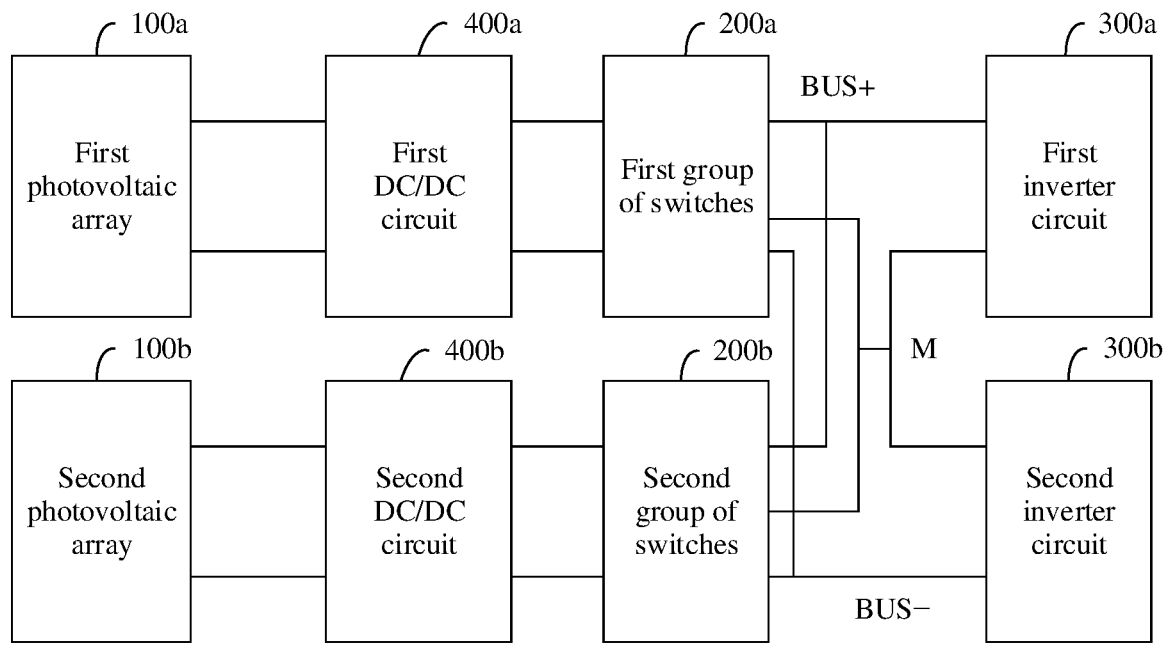
FIG. 7 is a schematic diagram of an implementation corresponding to FIG. 6.

FIG. 7 is a schematic diagram of an implementation corresponding to FIG. 6.

In a possible implementation, the DC/DC converter includes a first DC/DC circuit 400a and a second DC/DC circuit 400b; the switch circuit includes the first group of switches 200a and the second group of switches 200b; and both the first group of switches 200a and the second group of switches 200b include a first state and a second state.

An output end of the first photovoltaic array 100a is connected to an input end of the first DC/DC circuit 400a, and an output end of the first DC/DC circuit 400a is connected to the first group of switches 200a. An output end of the second photovoltaic array 100b is connected to an input end of the second DC/DC circuit 400b, and an output end of the second DC/DC circuit 400b is connected to the second group of switches 200b. The first DC/DC circuit 400a corresponds to the first group of switches 200a, and the first group of switches 200a is configured to switch connection relationships between the first DC/DC circuit 400a and the two inverter circuits. The second DC/DC circuit 400b corresponds to the second group of switches 200b, and the second group of switches 200b is configured to switch connection relationships between the second group of switches 200b and the two inverter circuits.

When both the first group of switches 200a and the second group of switches 200b are in the first state, the first DC/DC circuit 400a is connected to the direct current positive bus BUS+ and the neutral bus M through the first group of switches 200a, and the second DC/DC circuit 400b is connected to the neutral bus M and the direct current negative bus BUS− through the second group of switches 200b.

When both the first group of switches 200a and the second group of switches 200b are in the second state, the first DC/DC circuit 400a is connected to the neutral bus M and the direct current negative bus BUS− through the first group of switches 200a, and the second DC/DC circuit 400b is connected to the direct current positive bus BUS+ and the neutral bus M through the second group of switches 200*b*.

In the bipolar photovoltaic system provided in this embodiment, the switch circuit is located between the DC/DC circuit and a DC/AC circuit, that is, the switch circuit is located between the DC/DC circuit and the three direct current buses. When the two groups of switches are in different states, whether the DC/DC circuit is connected to the direct current positive bus or the direct current negative bus may be changed.

In the bipolar photovoltaic system provided in this embodiment, a direct current bus connected to the first DC/DC circuit 400*a* and the second DC/DC circuit 400*b* may be changed based on different states of the first group of switches 200*a* and the second group of switches 200*b*, to change a potential of the DC/DC circuit. In addition, because the output end of the first photovoltaic array 100*a* is connected to the input end of the first DC/DC circuit 400*a*, and the output end of the second photovoltaic array 100*b* is connected to the input end of the second DC/DC circuit 400*b*, when potentials of the first DC/DC circuit 400*a* and the second DC/DC circuit 400*b* change, potentials corresponding to the first photovoltaic array 100*a* and the second photovoltaic array 100*b* are also equivalently changed, to prevent the photovoltaic array from operating at a negative potential for a long time. Therefore, a PID effect of the first photovoltaic array 100*a* and the second photovoltaic array 100*b* can be suppressed, and a service life of a photovoltaic module in the photovoltaic array can be prolonged.

An implementation of the two groups of switches is not limited in embodiments. The two groups of switches may be single-pole double-throw switches or may be independent switches. The following separately provides descriptions with reference to the accompanying drawings. In addition, the two groups of switches may be integrated in one housing or may be disposed independently.

Figure 8:
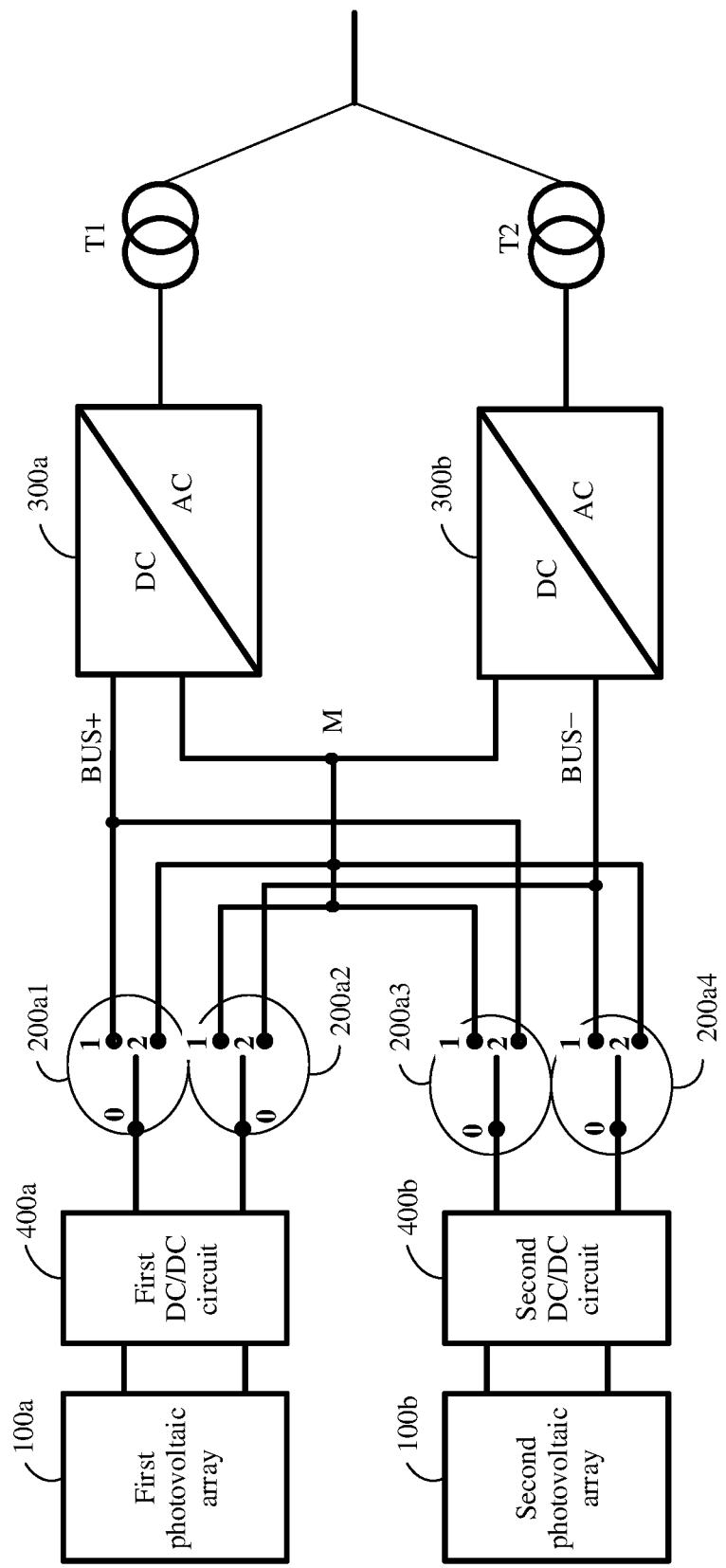
FIG. 8 is a circuit diagram corresponding to FIG. 7.

FIG. 8 is a circuit diagram corresponding to FIG. 7.

A difference between FIG. 8 and FIG. 4 lies in that the first DC/DC circuit 400*a* and the second DC/DC circuit 400*b* are added in FIG. 8, and four single-pole double-throw switches are located between the DC/DC circuit and the DC/AC circuit.

The first group of switches includes a first single-pole double-throw switch 200*a*1 and a second single-pole double-throw switch 200*a*2, and the second group of switches includes a third single-pole double-throw switch 200*a*3 and a fourth single-pole double-throw switch 200*a*4.

A movable contact 0 of the first single-pole double-throw switch 200*a*1 is connected to a positive output end of the first DC/DC circuit 400*a*, and a first stationary contact 1 and a second stationary contact 2 of the first single-pole double-throw switch 200*a*1 are respectively connected to the direct current positive bus BUS+ and the neutral bus M. A movable contact 0 of the second single-pole double-throw switch 200*a*2 is connected to a negative output end of the first DC/DC circuit 400*a*, and a first stationary contact 1 and a second stationary contact 2 of the second single-pole double-throw switch 200*a*2 are respectively connected to the neutral bus M and the direct current negative bus BUS−. A movable contact 0 of the third single-pole double-throw switch 200*a*3 is connected to a positive output end of the second DC/DC circuit 400*b*, and a first stationary contact 1 and a second stationary contact 2 of the third single-pole double-throw switch 200*a*3 are respectively connected to the neutral bus M and the direct current positive bus BUS+. A movable contact 0 of the fourth single-pole double-throw switch 200*a*4 is connected to a negative output end of the second DC/DC circuit 400*b*, and a first stationary contact 1 and a second stationary contact 2 of the fourth single-pole double-throw switch 200*a*4 are respectively connected to the direct current negative bus BUS− and the neutral bus M.

When all of the first single-pole double-throw switch 200*a*1, the second single-pole double-throw switch 200*a*2, the third single-pole double-throw switch 200*a*3, and the fourth single-pole double-throw switch 200*a*4 are in a first state, the positive output end and the negative output end of the first DC/DC circuit 400*a* are respectively connected to the direct current positive bus BUS+ and the neutral bus M, and the positive output end and the negative output end of the second DC/DC circuit 400*b* are respectively connected to the neutral bus M and the direct current negative bus BUS−.

When all of the first single-pole double-throw switch 200*a*1, the second single-pole double-throw switch 200*a*2, the third single-pole double-throw switch 200*a*3, and the fourth single-pole double-throw switch 200*a*4 are in a second state, the positive output end and the negative output end of the first DC/DC circuit 400*a* are respectively connected to the neutral bus M and the direct current negative bus BUS−, and the positive output end and the negative output end of the second DC/DC circuit 400*b* are respectively connected to the direct current positive bus BUS+ and the neutral bus M.

The first single-pole double-throw switch 200*a*1 and the second single-pole double-throw switch 200*a*2 may correspond to the first DC/DC circuit 400*a* and may be configured to switch connection relationships between the first DC/DC circuit 400*a* and the two DC/AC circuits. The third single-pole double-throw switch 200*a*3 and the fourth single-pole double-throw switch 200*a*4 correspond to the second DC/DC circuit 400*b* and are configured to switch connection relationships between the second DC/DC circuit 400*b* and the two DC/AC circuits.

A first input end of the first DC/AC circuit 300*a* is connected to BUS+, and a second input end of the first DC/AC circuit 300*a* is connected to M. A first input end of the second DC/AC circuit 300*b* is connected to M, and a second input end of the second DC/AC circuit 300*b* is connected to BUS−. The second input end of the first DC/AC circuit 300*a* and the first input end of the second DC/AC circuit 300*b* are connected to each other, and are both connected to M.

For example, switch states of the four single-pole double-throw switches in FIG. 8 may be controlled by a controller, and the controller may switch the states of the four single-pole double-throw switches by a preset cycle. For example, the preset cycle may be one cycle or two cycles. A time length of the preset cycle is not limited in the embodiments, and may be set based on an actual requirement. In an initial state, the first DC/DC circuit 400*a* is connected to BUS+ and M through the first single-pole double-throw switch 200*a*1 and the second single-pole double-throw switch 200*a*2. In addition, because the first photovoltaic array 100*a* is connected to the first DC/DC circuit 400*a*, the first photovoltaic array 100*a* corresponds to a positive potential. Similarly, in this case, the second photovoltaic array 100*b* corresponds to a negative potential. Therefore, a PID effect occurs in the second photovoltaic array 100*b*, and power generation efficiency of the second photovoltaic array 100*b* is affected.

To prevent the second photovoltaic array 100*b* from being at the negative potential for a long time to cause a severe PID effect, the following uses an example in which the preset cycle is one cycle for description. After one week, to suppress the PID effect of the second photovoltaic array 100b, the controller switches the switch states of the four single-pole double-throw switches, and switches from the first state to the second state. In this case, the first DC/DC circuit 400a is connected to M and the BUS− through the first single-pole double-throw switch 200a1 and the second single-pole double-throw switch 200a2, and the second DC/DC circuit 400b is connected to BUS+ and M through the third single-pole double-throw switch 200a3 and the fourth single-pole double-throw switch 200a4. Therefore, in this case, the first photovoltaic array 100a corresponds to the negative potential (−1500V to 0V), and the second photovoltaic array 100b corresponds to the positive potential (0V to 1500V), so that the PID effect of the second photovoltaic array 100b can be suppressed.

Because a PID effect occurs in a photovoltaic array operating at a negative potential, when the four single-pole double-throw switches are in the second state, the first photovoltaic array 100a corresponds to the negative potential (−1500V to 0V), and a PID effect also occurs. To suppress the PID effect of the first photovoltaic array 100a, after the first photovoltaic array 100a operates at the negative potential (−1500V to 0V) for one preset cycle, the controller switches the four single-pole double-throw switches back to the first state, to suppress the PID effect of the first photovoltaic array 100a.

Therefore, the controller may switch the states of the four single-pole double-throw switches by the preset cycle, that is, switch from the first state to the second state, and then switch from the second state to the first state after each preset cycle. This is performed in circulation.

To ensure that power generation of the photovoltaic system is not affected when the four single-pole double-throw switches perform state switching, the four single-pole double-throw switches may perform state switching at night, that is, perform state switching at night, when there is no sunlight and the photovoltaic array does not output a direct current. For example, the four single-pole double-throw switches are switched from the first state to the second state at night, and when there is sun in the daytime on the next day, the first photovoltaic array 100a corresponds to a negative potential, and the second photovoltaic array 100b corresponds to a positive potential, to implement potential switching and perform normal power generation work.

A location of the controller is not limited in the embodiments. The controller may be integrated with the two DC/DC circuits or may be integrated with the two DC/AC circuits.

When the two DC/DC circuits and the two DC/AC circuits are disposed independently, the four single-pole double-throw switches may be integrated in a cabinet of the two DC/DC circuits, and the controller may also be integrated in the cabinet of the DC/DC circuits.

When the two DC/DC circuits and the two DC/AC circuits are integrated in one cabinet, the controller is also integrated in the cabinet.

For a purpose of saving costs and space, a controller corresponding to the four single-pole double-throw switches may be implemented by a controller of the DC/DC circuit without a design of an additional controller.

In a possible implementation, for example, an output end of the first DC/AC circuit 300a is connected to a first transformer T1, and an output end of the second DC/AC circuit 300b is connected to a second transformer T2. Both T1 and T2 may be isolation transformers. In addition, output ends of the two DC/AC circuits may be further connected to one multi-winding transformer. This is not limited in embodiments.

The switch circuit described in FIG. 8 is implemented by using the single-pole double-throw switch. The following describes the switch circuit by using independent switches.

Figure 9:
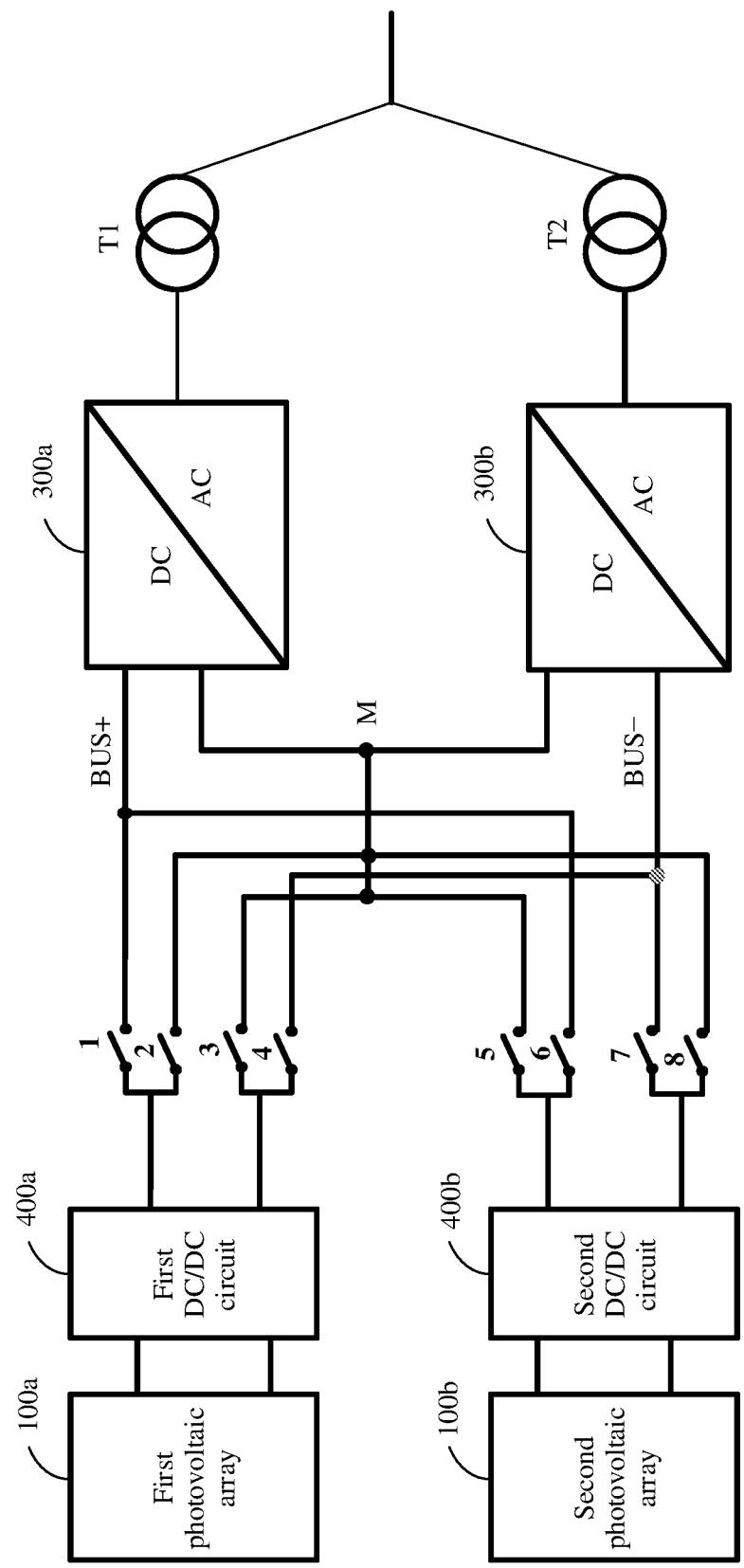
FIG. 9 is another circuit diagram corresponding to FIG. 7.

FIG. 9 is a circuit diagram corresponding to FIG. 7.

The first group of switches includes the first switch 1, the second switch 2, the third switch 3, and the fourth switch 4, and the second group of switches includes the fifth switch 5, the sixth switch 6, the seventh switch 7, and the eighth switch 8.

Both a first end of the first switch 1 and a first end of the second switch 2 are connected to a positive output end of the first DC/DC circuit 400a, and a second end of the first switch 1 and a second end of the second switch 2 are respectively connected to a positive input end of the first inverter circuit 300a and a positive input end of the second inverter circuit 300b. Both a first end of the third switch 3 and a first end of the fourth switch 4 are connected to a negative output end of the first DC/DC circuit 400a, and a second end of the third switch 3 and a second end of the fourth switch 4 are respectively connected to a negative input end of the first inverter circuit 300a and a negative input end of the second inverter circuit 300b. Both a first end of the fifth switch 5 and a first end of the sixth switch 6 are connected to a positive output end of the second DC/DC circuit 400b, and a second end of the fifth switch 5 and a second end of the sixth switch 6 are respectively connected to the positive input end of the second inverter circuit 300b and the positive input end of the first inverter circuit 300a. Both a first end of the seventh switch 7 and a first end of the eighth switch 8 are connected to a negative output end of the second DC/DC circuit 400b, and a second end of the seventh switch 7 and a second end of the eighth switch 8 are respectively connected to a negative input end of the second inverter circuit 300b and the negative input end of the first inverter circuit 300a. The negative input end of the first inverter circuit 300a is connected to the positive input end of the second inverter circuit 300b.

When all of the first switch 1, the third switch 3, the fifth switch 5, and the seventh switch 7 are in a first state, and all of the second switch 2, the fourth switch 4, the sixth switch 6, and the eighth switch 8 are in a second state, the positive output end and the negative output end of the first DC/DC circuit 400a are respectively connected to the direct current positive bus BUS+ and the neutral bus M, and the positive output end and the negative output end of the second DC/DC circuit 400b are respectively connected to the neutral bus M and the direct current negative bus BUS−. When the switch circuit includes eight independent switches, the first state corresponds to closing of the switch, and the second state corresponds to opening of the switch. In other words, the first state and the second state are two opposite states. This is different from the single-pole double-throw switch. The first state and the second state of the single-pole double-throw switch respectively refer to contact between the movable contact and the first stationary contact and contact between the movable contact and the second stationary contact. In this case, contact means closing.

When all of the first switch 1, the third switch 3, the fifth switch 5, and the seventh switch 7 are in the second state, and all of the second switch 2, the fourth switch 4, the sixth switch 6, and the eighth switch 8 are in the first state, the positive output end and the negative output end of the first DC/DC circuit 400a are respectively connected to the neutral bus M and the direct current negative bus BUS−, and the positive output end and the negative output end of the second DC/DC circuit 400b are respectively connected to the direct current positive bus BUS+ and the neutral bus M.

Positions of the eight switches are not limited in the embodiments. The eight switches may be integrated together or may be disposed independently. For example, the first switch 1 to the fourth switch 4 corresponding to the first DC/DC circuit 400a are integrated together, and the fifth switch 5 to the eighth switch 8 corresponding to the second DC/DC circuit 400b are integrated together. In addition, the switch may be integrated with the DC/DC circuit. For example, when the DC/DC circuit is relatively far away from the DC/AC circuit, the DC/DC circuit may correspond to one cabinet, and the DC/AC circuit may correspond to one cabinet. In this case, the switch circuit may be integrated in the cabinet of the DC/DC circuit or may be integrated in the cabinet of the DC/AC circuit. This is not limited in the embodiments. As long as the switch circuit can switch connections between the DC/DC circuit and different direct current buses.

The foregoing describes a case in which the switch circuit is located between the DC/DC converter and the DC/AC circuit. The following describes an implementation in which the switch circuit is located between the photovoltaic array and the DC/DC converter.

Figure 10:
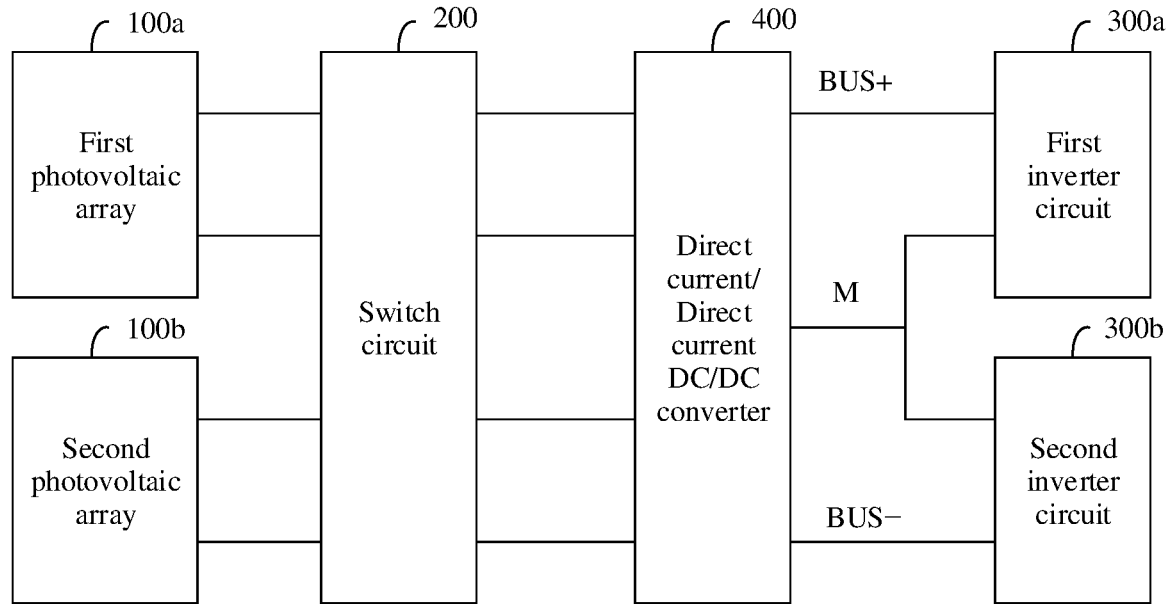
FIG. 10 is a schematic diagram of another photovoltaic system according to an embodiment.

FIG. 10 is a schematic diagram of another bipolar photovoltaic system according to an embodiment.

In this embodiment, an example in which a bipolar photovoltaic system includes a DC/DC converter is still used for description. A switch circuit is connected between an input end of the DC/DC converter and a photovoltaic array. It should be noted that, in the embodiments, an example in which energy is transferred from a photovoltaic array to an output end of an inverter circuit is used for description. The input ends and the output ends are defined based on this example. However, the DC/DC circuit and the DC/AC circuit in the embodiments may operate bidirectionally. In other words, energy may alternatively be transferred from the DC/AC circuit to the DC/DC circuit.

Both the first photovoltaic array 100a and the second photovoltaic array 100b are connected to the input end of the DC/DC converter through the switch circuit.

An output end of the DC/DC converter 400 is connected to the direct current positive bus BUS+, the neutral bus M, and the direct current negative bus BUS−. A first input end (positive input end) of the first inverter circuit 300a is connected to BUS+, a second input end (negative input end) of the first inverter circuit 300a is connected to M, a first input end (positive input end) of the second inverter circuit 300b is connected to M, and a second input end (negative input end) of the second inverter circuit 300b is connected to BUS−.

Figure 11:
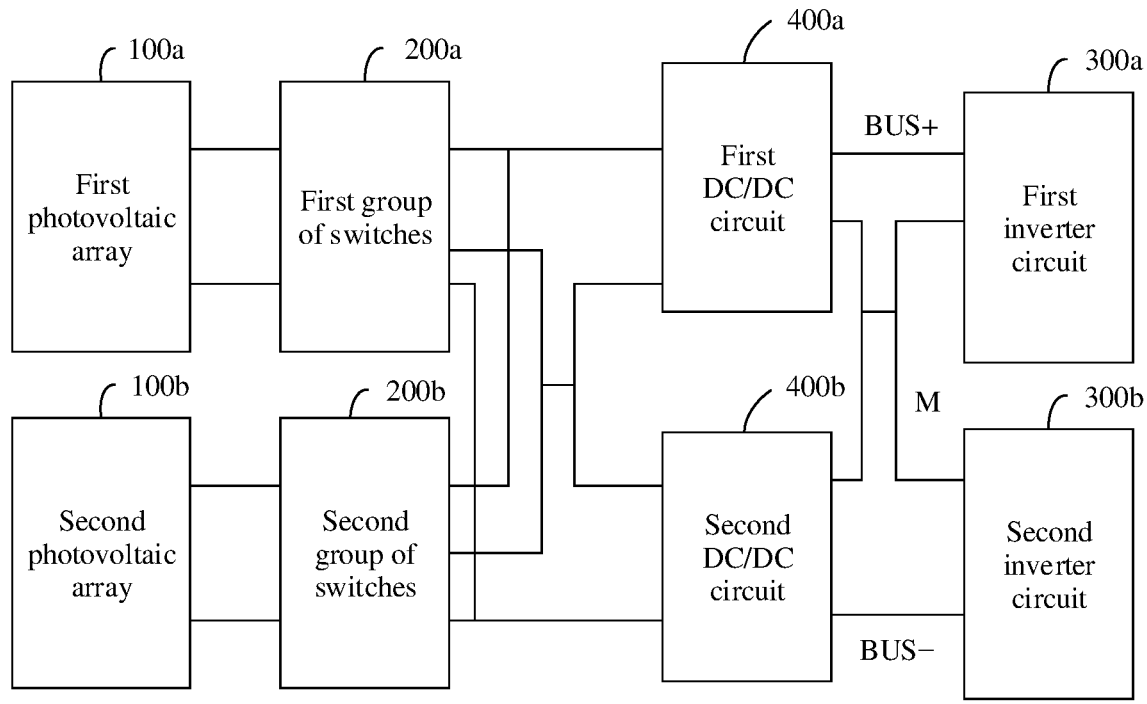
FIG. 11 is a schematic diagram corresponding to FIG. 10.

FIG. 11 is a schematic diagram corresponding to FIG. 10.

In this embodiment, an example in which the DC/DC converter includes the following two DC/DC circuits is used for description: the first DC/DC circuit 400a and the second DC/DC circuit 400b; and an example in which the switch circuit includes the following two groups of switches is used for description: the first group of switches 200a and the second group of switches 200b. Both the first group of switches 200a and the second group of switches 200b include a first state and a second state. The first state and the second state correspond to different states of the switch. For example, when the switch is a single-pole double-throw switch, the first state may be that a movable contact is in contact with a first stationary contact, and the second state may be that the movable contact is in contact with a second stationary contact. When the switch is a common switch, the first state may correspond to closing, and the second state may correspond to opening. The first state means that the first DC/DC circuit 400a is connected to the first photovoltaic array 100a, and the second state means that the first DC/DC circuit 400a is connected to the second photovoltaic array 100b.

It should be understood that the first state and the second state are relative concepts.

A positive output end and a negative output end of the first DC/DC circuit 400a are respectively connected to the direct current positive bus BUS+ and the neutral bus M. A positive output end and a negative output end of the second DC/DC circuit 400b are respectively connected to the neutral bus M and the direct current negative bus BUS−.

In addition, a first input end (positive input end) of the first inverter circuit 300a is connected to BUS+, a second input end (negative input end) of the first inverter circuit 300a is connected to M, a first input end (positive input end) of the second inverter circuit 300b is connected to M, and a second input end (negative input end) of the second inverter circuit 300b is connected to BUS−.

An output end of the first photovoltaic array 100a is connected to the first group of switches 200a, and an output end of the second photovoltaic array 100b is connected to the second group of switches 200b.

When both the first group of switches 200a and the second group of switches 200b are in the first state, the first photovoltaic array 100a is connected to the first DC/DC circuit 400a through the first group of switches 200a, and the second photovoltaic array 100b is connected to the second DC/DC circuit 400b through the second group of switches 200b.

When both the first group of switches 200a and the second group of switches 200b are in the second state, the second photovoltaic array 100b is connected to the first DC/DC circuit 400a through the second group of switches 200b, and the first photovoltaic array 100a is connected to the second DC/DC circuit 400b through the first group of switches 200a.

In other words, in the bipolar photovoltaic system provided in this embodiment, the switch circuit is located between the DC/DC circuit and the photovoltaic array. A connection relationship between the DC/DC circuit and the photovoltaic array may be changed when states of the two groups of switches are different. For example, for the first photovoltaic array, when states of the switch circuits are different, the first photovoltaic array 100a has two different connection relationships. In the first state, the first photovoltaic array 100a may be connected to the first DC/DC circuit 400a, and in the second state, the first photovoltaic array 100a may be connected to the second DC/DC circuit 400b.

According to the bipolar photovoltaic system provided in this embodiment, connection relationships between the photovoltaic array and the first DC/DC circuit 400a and the second DC/DC circuit 400b may be changed based on different states of the first group of switches 200a and the second group of switches 200b. Because the first DC/DC circuit 400a and the second DC/DC circuit 400b are connected to different direct current buses, the first DC/DC circuit 400a and the second DC/DC circuit 400b are corresponding to different potentials.

When the photovoltaic array is connected to the first DC/DC circuit 400a, the photovoltaic array is connected to a positive potential. When the photovoltaic array is connected to the second DC/DC circuit 400b, the photovoltaic array is connected to a negative potential. Therefore, when the photovoltaic arrays are respectively connected to the first DC/DC circuit 400a and the second DC/DC circuit 400b, corresponding potentials are different, that is, potentials of the photovoltaic arrays are different, that is, potentials of the first photovoltaic array 100a and the second photovoltaic array 100b are changed. In this way, the photovoltaic array is not operated at a fixed potential for a long time, such as at a negative potential for a long time. Therefore, PID effects of the first photovoltaic array 100a and the second photovoltaic array 100b can be suppressed, a decrease in a short-circuit current, an open-circuit voltage, and a fill factor of a photovoltaic module can be avoided, and a service life of the photovoltaic module in the photovoltaic array is prolonged.

The following describes two implementations of the switch circuit. First, an example in which the switch circuit includes a plurality of single-pole double-throw switches is described.

Figure 12:
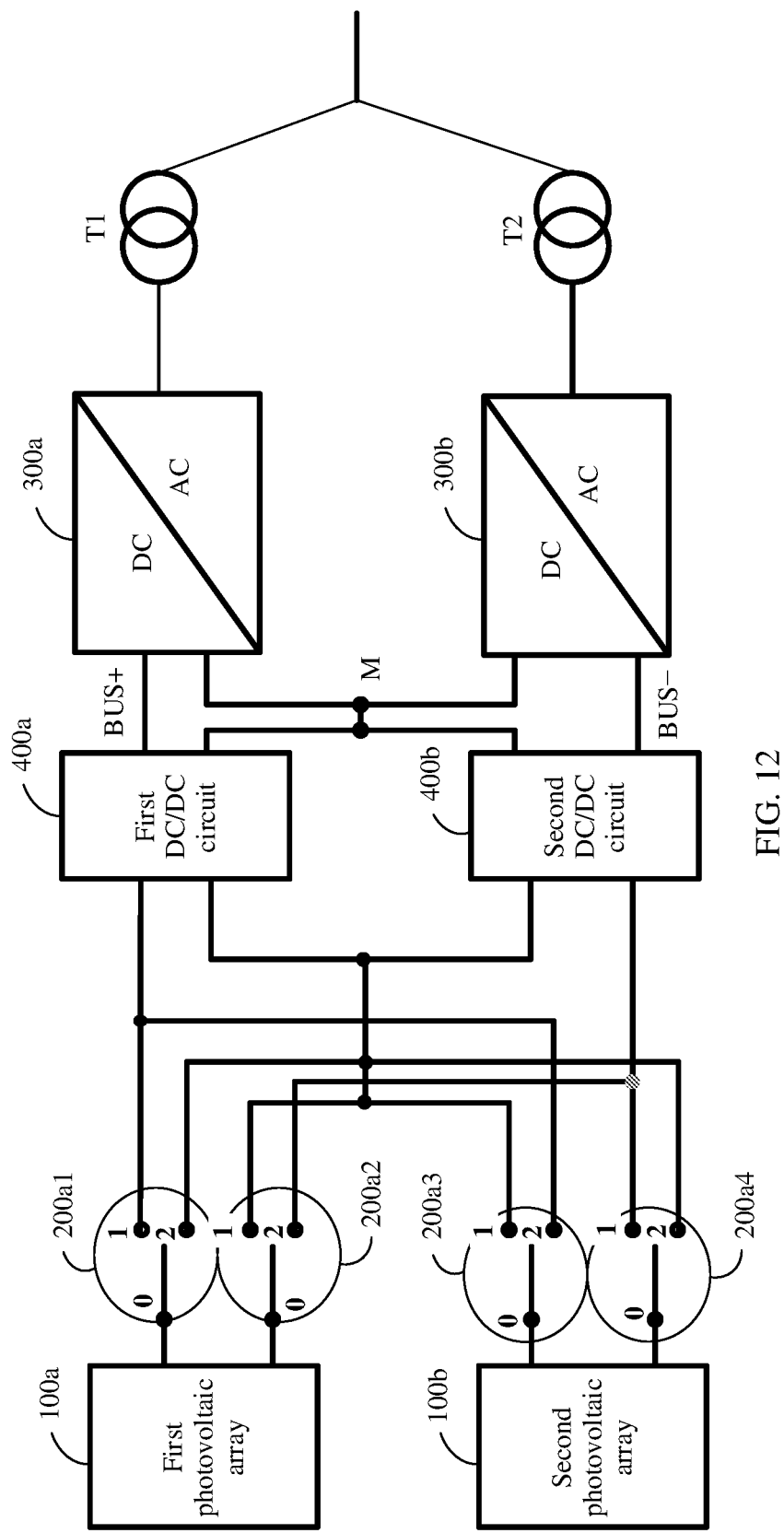
FIG. 12 is a circuit diagram corresponding to FIG. 11.

FIG. 12 is a circuit diagram corresponding to FIG. 11.

This embodiment is described by using an example in which both the first group of switches and the second group of switches include two single-pole double-throw switches. The first group of switches may include the first single-pole double-throw switch 200a1 and the second single-pole double-throw switch 200a2 and the second group of switches may include the third single-pole double-throw switch 200a3 and the fourth single-pole double-throw switch 200a4.

A movable contact 0 of the first single-pole double-throw switch 200a1 is connected to a positive output end of the first photovoltaic array 100a. A movable contact 0 of the second single-pole double-throw switch 200a2 is connected to a negative output end of the first photovoltaic array 100a. A first stationary contact 1 and a second stationary contact 2 of the first single-pole double-throw switch 200a1 are respectively connected to a positive input end of the first DC/DC circuit 400a and a positive input end of the second DC/DC circuit. A first stationary contact 1 and a second stationary contact 2 of the second single-pole double-throw switch 200a2 are respectively connected to a negative input end of the first DC/DC circuit 400a and a negative input end of the second DC/DC circuit 400b. The negative input end of the first DC/DC circuit 400a is connected to the positive input end of the second DC/DC circuit 400b. A movable contact 0 of the third single-pole double-throw switch 200a3 is connected to a positive output end of the second photovoltaic array 100b. A movable contact 0 of the fourth single-pole double-throw switch 200a4 is connected to a negative output end of the second photovoltaic array 100b. A first stationary contact 1 and a second stationary contact 2 of the third single-pole double-throw switch 200a3 are respectively connected to the positive input end of the second DC/DC circuit 400b and the positive input end of the first DC/DC circuit 400a. A first stationary contact 1 and a second stationary contact 2 of the fourth single-pole double-throw switch 200a4 are respectively connected to the negative input end of the second DC/DC circuit 400b and the negative input end of the first DC/DC circuit 400a.

When all of the first single-pole double-throw switch 200a1, the second single-pole double-throw switch 200a2, the third single-pole double-throw switch 200a3, and the fourth single-pole double-throw switch 200a4 are in a first state, the positive output end and the negative output end of the first photovoltaic array 100a are respectively connected to the positive input end and the negative input end of the first DC/DC circuit 400a, and the positive output end and the negative output end of the second photovoltaic array 100b are respectively connected to the positive input end and the negative input end of the second DC/DC circuit 400b.

When all of the first single-pole double-throw switch 200a1, the second single-pole double-throw switch 200a2, the third single-pole double-throw switch 200a3, and the fourth single-pole double-throw switch 200a4 are in a second state, the positive output end and the negative output end of the first photovoltaic array 100a are respectively connected to the positive input end and the negative input end of the second DC/DC circuit 400b, and the positive output end and the negative output end of the second photovoltaic array 100b are respectively connected to the positive input end and the negative input end of the first DC/DC circuit 400a.

It should be understood that, for a single-pole double-throw switch, the first state refers to contact between the movable contact and the first stationary contact, that is, closing. The second state refers to contact between the movable contact and the second stationary contact, that is, closing. The first state and the second state do not coexist, and the first state and the second state are relative concepts.

A bipolar photovoltaic system is used as an example. When switching of corresponding potentials of two photovoltaic arrays is implemented, four single-pole double-throw switches are needed, and when the switch circuit includes a plurality of independent switches, eight independent switches are needed. Therefore, compared with the eight independent switches, the four single-pole double-throw switches have a smaller quantity and lower costs. In addition, the switch circuit may occupy less space, the four switches correspond to fewer control signals, and control is relatively simple and easy to implement.

The following describes an implementation in which the switch circuit includes a plurality of independent switches.

In this embodiment, eight independent switches are used to implement switching of corresponding potentials of two photovoltaic arrays. Because the eight switches are disposed independently, control and actions of the switches are performed independently, so that a reliable action of each switch can be ensured, and bonding between the switches does not occur, thereby ensuring accurate and correct switching of potentials corresponding to the two photovoltaic arrays.

Figure 13:
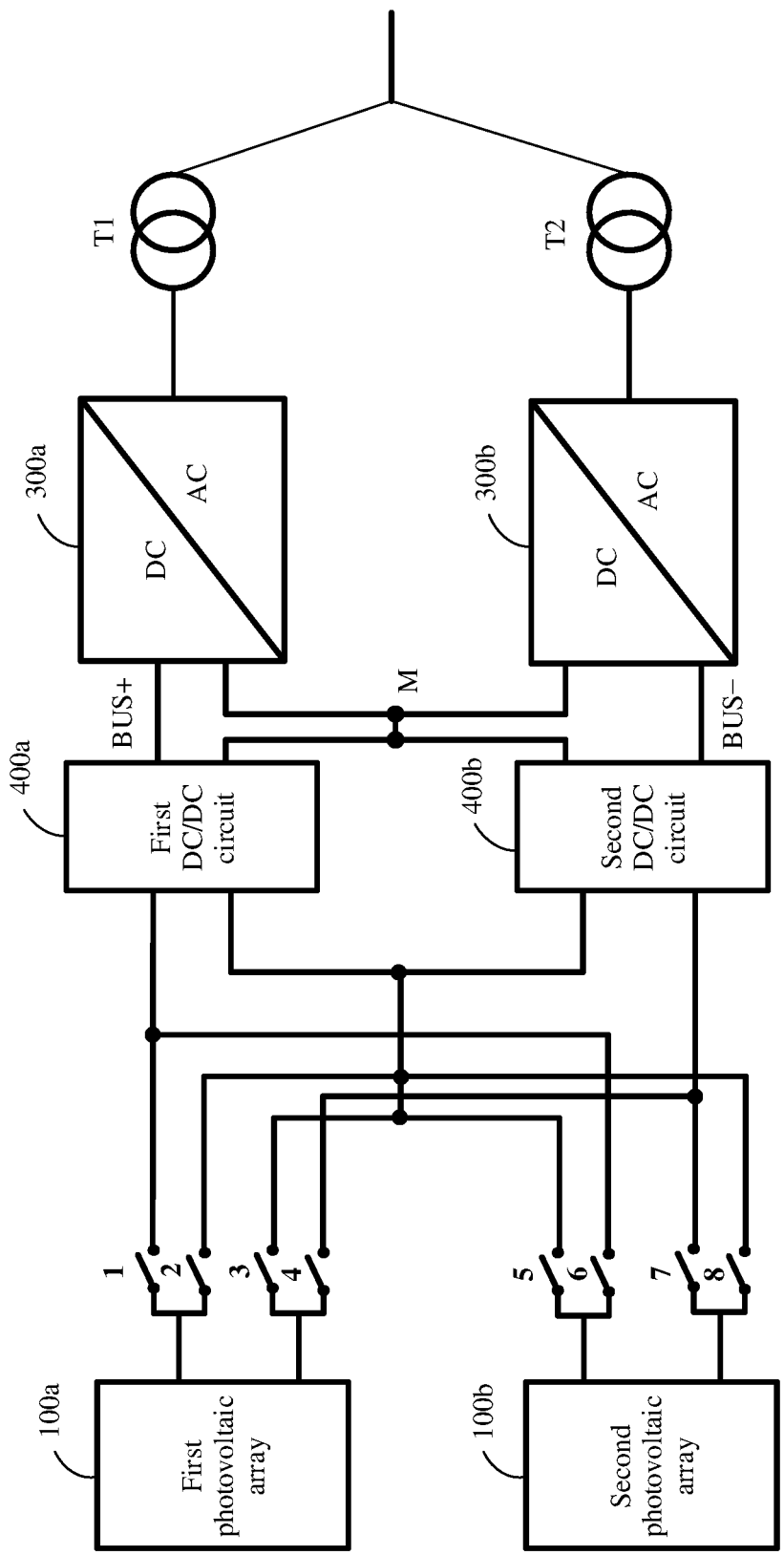
FIG. 13 is another circuit diagram corresponding to FIG. 11.

FIG. 13 is another circuit diagram corresponding to FIG. 11.

In the bipolar photovoltaic system provided in this embodiment, the first group of switches includes the first switch 1, the second switch 2, the third switch 3, and the fourth switch 4, and the second group of switches includes the fifth switch 5, the sixth switch 6, the seventh switch 7, and the eighth switch 8.

Both a first end of the first switch 1 and a first end of the second switch 2 are connected to a positive output end of the first photovoltaic array 100a, a second end of the first switch 1 is connected to a positive input end of the first DC/DC circuit 400a, and a second end of the second switch 2 is connected to a positive input end of the second DC/DC circuit. Both a first end of the third switch 3 and a first end of the fourth switch 4 are connected to a negative output end of the first photovoltaic array 100a, a second end of the third switch 3 is connected to a negative input end of the first DC/DC circuit 400a, and a second end of the fourth switch 4 is connected to a negative input end of the second DC/DC circuit 400b. Both a first end of the fifth switch 5 and a first end of the sixth switch 6 are connected to a positive output end of the second photovoltaic array 100b, a second end of the fifth switch 5 is connected to the positive input end of the second DC/DC circuit 400b, and a second end of the sixth switch 6 is connected to the positive input end of the first DC/DC circuit 400*a*. Both a first end of the seventh switch 7 and a first end of the eighth switch 8 are connected to a negative output end of the second photovoltaic array 100*b*, a second end of the seventh switch 7 is connected to the negative input end of the second DC/DC circuit 400*b*, and a second end of the eighth switch 8 is connected to the negative input end of the first DC/DC circuit 400*a*. The negative input end of the first DC/DC circuit 400*a* is connected to the positive input end of the second DC/DC circuit 400*b*.

When all of the first switch 1, the third switch 3, the fifth switch 5, and the seventh switch 7 are in a first state, and all of the second switch 2, the fourth switch 4, the sixth switch 6, and the eighth switch 8 are in a second state, the positive output end and the negative output end of the first photovoltaic array 100*a* are respectively connected to the positive input end and the negative input end of the first DC/DC circuit 400*a*, and the positive output end and the negative output end of the second photovoltaic array 100*b* are respectively connected to the positive input end and the negative input end of the second DC/DC circuit 400*b*.

When all of the first switch 1, the third switch 3, the fifth switch 5, and the seventh switch 7 are in the second state, and all of the second switch 2, the fourth switch 4, the sixth switch 6, and the eighth switch 8 are in the first state, the positive output end and the negative output end of the first photovoltaic array 100*a* are respectively connected to the positive input end and the negative input end of the second DC/DC circuit 400*b*, and the positive output end and the negative output end of the second photovoltaic array 100*b* are respectively connected to the positive input end and the negative input end of the first DC/DC circuit 400*a*.

When the switch circuit includes eight independent switches, the first state corresponds to closing of the switch, and the second state corresponds to opening of the switch. In other words, the first state and the second state are two opposite states. This is different from the single-pole double-throw switch. The first state and the second state of the single-pole double-throw switch respectively refer to contact between the movable contact and the first stationary contact and contact between the movable contact and the second stationary contact. In this case, contact means closing.

Positions of the eight switches are not limited in the embodiments. The eight switches may be integrated together or may be disposed independently. For example, the first switch 1 to the fourth switch 4 corresponding to the first DC/DC circuit 400*a* are integrated together, and the fifth switch 5 to the eighth switch 8 corresponding to the second DC/DC circuit 400*b* are integrated together. In addition, the switch may be integrated with the DC/DC circuit. For example, when the DC/DC circuit is relatively far away from the DC/AC circuit, the DC/DC circuit may correspond to one cabinet, and the DC/AC circuit may correspond to one cabinet. In this case, the switch circuit may be integrated in the cabinet of the DC/DC circuit or may be integrated in the cabinet of the DC/AC circuit. This is not limited in the embodiments. As long as the switch circuit can switch connections between the DC/DC circuit and different direct current buses.

In all of the foregoing embodiments, an example in which the two inverter circuits are connected to independent isolation transformers respectively is described. The following describes a case in which two inverter circuits are connected to a same multi-winding transformer.

Figure 14:
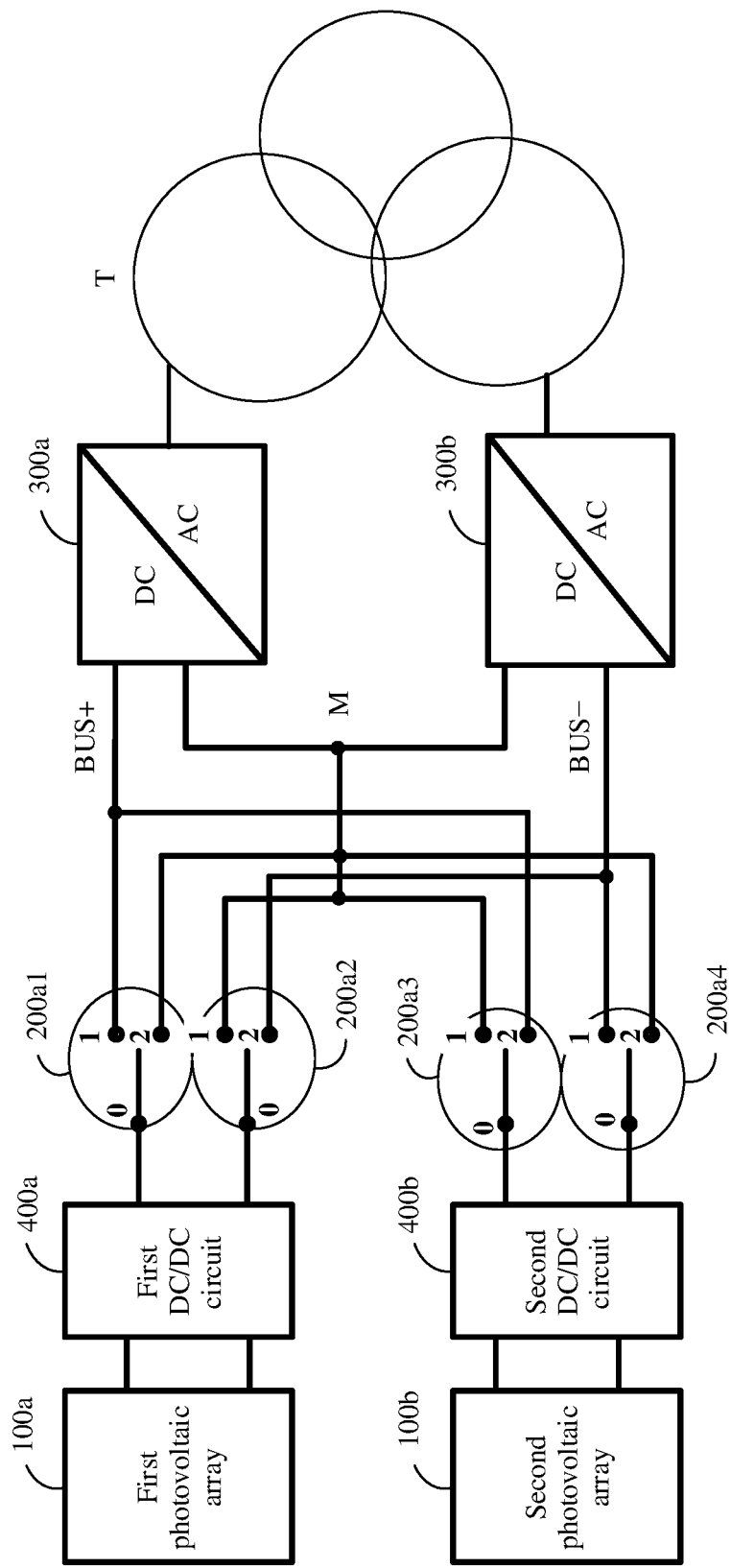
FIG. 14 is a schematic diagram of another photovoltaic system according to an embodiment.

FIG. 14 is a schematic diagram of another bipolar photovoltaic system according to an embodiment.

As shown in FIG. 14, an output end of the first DC/AC circuit 300*a* is connected to a first primary-side winding of a multi-winding transformer T, and an output end of the second DC/AC circuit 300*b* is connected to a second primary-side winding of the multi-winding transformer T. The first primary-side winding and the second primary-side winding may correspond to a same secondary-side winding.

Compared with a connection to two independent transformers, a connection of two inverter circuits to one multi-winding transformer reduces a transformer volume, thereby saving space occupied by the transformer.

Power Supply System Embodiment

The photovoltaic system provided in the foregoing embodiments is described by using an example in which a power supply system is applied to the field of photovoltaic power generation technologies. In addition to the field of photovoltaic power generation technologies, the power supply system may be a bipolar system in another form, for example, may be applied to the field of wind power generation, hydropower generation, or energy storage technologies. The following provides detailed descriptions with reference to the accompanying drawings.

Embodiments further provide a power supply system, where a source of a direct current power supply may be renewable energy or may be non-renewable energy. The renewable energy may be, for example, at least one of photovoltaic power generation, wind power generation, or hydropower generation. The non-renewable energy may be, for example, an energy storage battery. The direct current power supply in the embodiments does not refer to a fan or an energy storage battery but means that a source of the direct current power supply is a fan, an energy storage battery, or the like.

Figure 15:
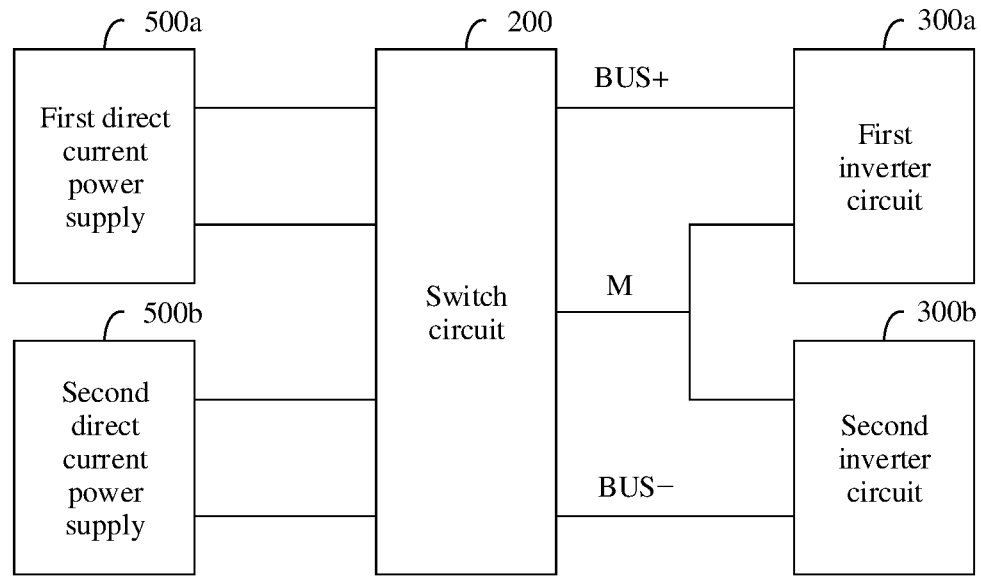
FIG. 15 is a schematic diagram of a power supply system according to an embodiment.

FIG. 15 is a schematic diagram of a power supply system according to an embodiment.

A power supply system provided in an embodiment may be a bipolar system, including a first inverter circuit 300*a*, a second inverter circuit 300*b*, and a switch circuit. The power supply system may further include a first direct current power supply 500*a* and a second direct current power supply 500*b*.

A first input end and a second input end of the first inverter circuit 300*a* are respectively connected to a direct current positive bus BUS+ and a neutral bus M. A first input end and a second input end of the second inverter circuit 300*b* are respectively connected to the neutral bus M and a direct current negative bus BUS−.

The switch circuit 200 includes a first state and a second state.

When the switch circuit 200 is in the first state, the first direct current power supply 500*a* is connected to the direct current positive bus BUS+ and the neutral bus M through the switch circuit, and the second direct current power supply 500*b* is connected to the neutral bus M and the direct current negative bus BUS− through the switch circuit. When the switch circuit 200 is in the second state, the first direct current power supply 500*a* is connected to the neutral bus M and the direct current negative bus BUS− through the switch circuit, and the second direct current power supply is connected to the direct current positive bus BUS+ and the neutral bus M through the switch circuit.

For example, a voltage corresponding to BUS+ is about 1500V, a voltage corresponding to BUS− is about −1500V, and a potential corresponding to M is a ground potential, that is, about 0V. When the switch circuit is in the first state, a potential corresponding to the first direct current power supply 500a is in a range of 0V to 1500V (including 0V and +1500V), and a potential corresponding to the second direct current power supply 500b is in a range of −1500V to 0V (including −1500V and 0V). When the switch circuit is in the second state, a potential corresponding to the first direct current power supply 500a is in the range of −1500V to 0V (including −1500V and 0V), and a potential corresponding to the second direct current power supply 500b is in the range of 0V to 1500V (including 0V and +1500V).

According to the power supply system provided in the embodiments, because an architecture of the power supply system is different from that of a unipolar photovoltaic system, the power supply system includes both a positive potential and a negative potential. Under a same bus voltage level, a safety level can be lowered to reduce a voltage stress of a power device. This facilitates type selection of the power device. Because the power supply system includes a negative potential, when a corresponding component operates at the negative potential for a long time, a service life of the component is affected. Therefore, a switch circuit is used to switch a potential corresponding to each component, to prolong a service life of the component. When the switch circuit is in different states, potentials corresponding to the two direct current power supplies change, to prevent the direct current power supplies from operating at a negative potential for a long time, and further prevent service lives of the direct current power supplies from being affected. In the embodiments, a potential corresponding to the direct current power supply may be switched, thereby helping improve a service life of the direct current power supply.

Figure 16:
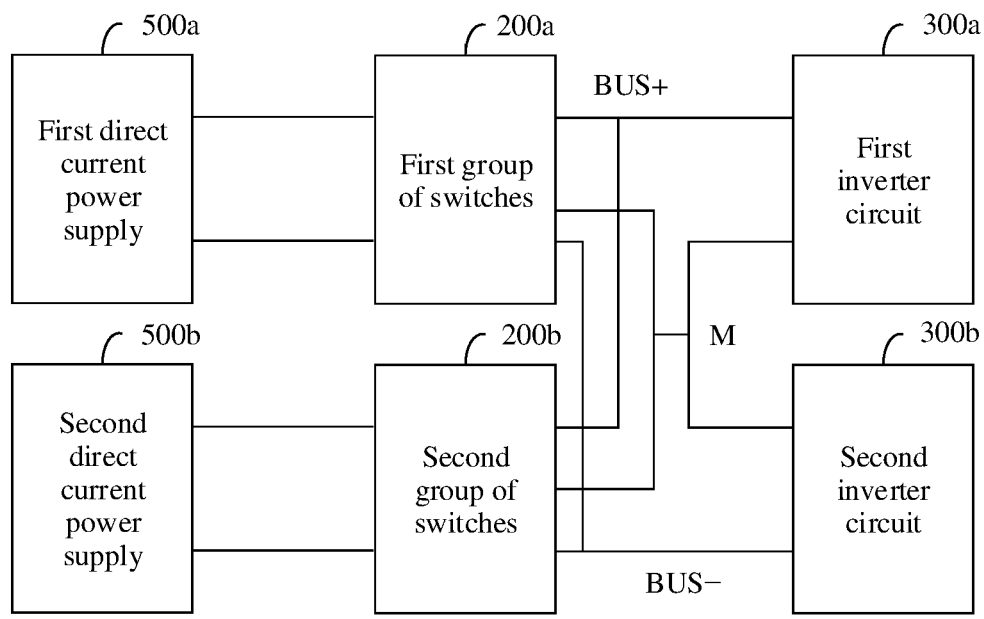
FIG. 16 is a schematic diagram of another power supply system according to an embodiment.

FIG. 16 is a schematic diagram of another bipolar system according to an embodiment.

In this embodiment, an example in which the switch circuit includes the following two groups of switches is used for description: a first group of switches 200a and a second group of switches 200b.

Both the first group of switches 200a and the second group of switches 200b include a first state and a second state.

When both the first group of switches 200a and the second group of switches 200b are in the first state, the first direct current power supply 500a is connected to the direct current positive bus and the neutral bus through the switch circuit, and the second direct current power supply 500b is connected to the neutral bus M and the direct current negative bus BUS− through the switch circuit.

When both the first group of switches 200a and the second group of switches 200b are in the second state, the first direct current power supply 500a is connected to the neutral bus M and the direct current negative bus BUS− through the switch circuit, and the second direct current power supply 500b is connected to the direct current positive bus BUS+ and the neutral bus M through the switch circuit.

The following describes an implementation in which the switch circuit is connected between a DC/DC converter and an inverter circuit.

Figure 17:
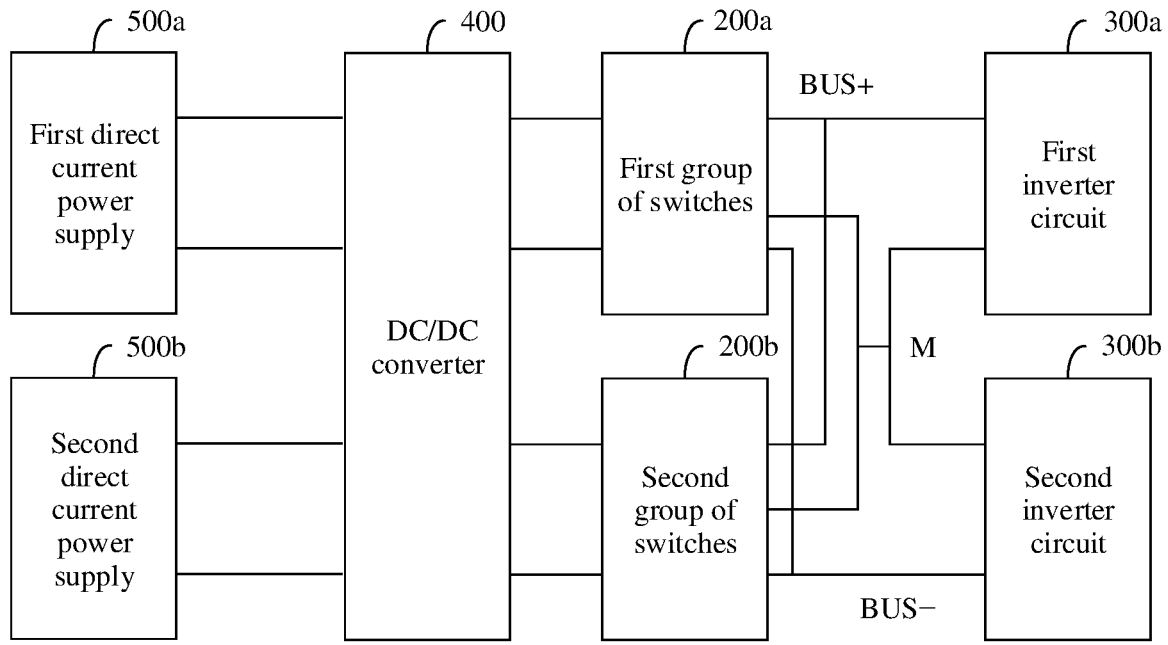
FIG. 17 is a schematic diagram of still another power supply system according to an embodiment.

FIG. 17 is a schematic diagram of still another bipolar system according to an embodiment.

The bipolar system provided in this embodiment may further include a direct current/direct current DC/DC converter 400.

An input end of the DC/DC converter 400 is connected to the first direct current power supply 500a and the second direct current power supply 500b, and an output end of the DC/DC converter 400 is connected to the direct current positive bus BUS+, the neutral bus M, and the direct current negative bus BUS−.

Both the first direct current power supply 500a and the second direct current power supply 500b are connected to the input end of the DC/DC converter 400 through the switch circuit 200.

The output end of the DC/DC converter 400 is connected to the direct current positive bus BUS+, the neutral bus M, and the direct current negative bus BUS− through the switch circuit.

It should be understood that, for an implementation of the switch circuit in a universal bipolar system provided in the embodiments, refer to the bipolar photovoltaic system described in the foregoing embodiments. Details are not described herein again. For example, the bipolar system may include a plurality of single-pole double-throw switches or may include a plurality of independent switches.

The following describes an implementation in which the switch circuit is connected between a direct current power supply and a DC/DC circuit.

Figure 18:
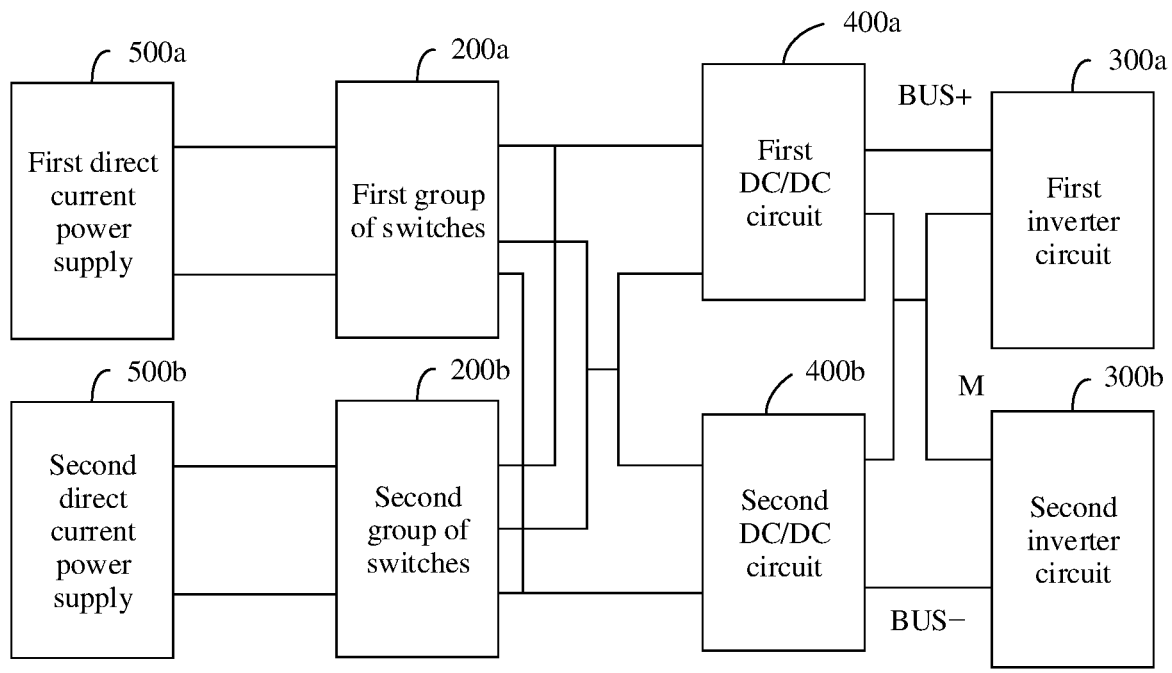
FIG. 18 is a schematic diagram of yet another power supply system according to an embodiment.

FIG. 18 is a schematic diagram of yet another bipolar system according to an embodiment.

The DC/DC converter includes a first DC/DC circuit 400a and a second DC/DC circuit 400b. The switch circuit includes the first group of switches 200a and the second group of switches 200b. Both the first group of switches 200a and the second group of switches 200b include a first state and a second state.

A positive output end and a negative output end of the first DC/DC circuit 400a are respectively connected to the direct current positive bus BUS+ and the neutral bus M. A positive output end and a negative output end of the second DC/DC circuit 400b are respectively connected to the neutral bus M and the direct current negative bus BUS−.

An output end of the first direct current power supply 500a is connected to the first group of switches 200a, and an output end of the second direct current power supply 500b is connected to the second group of switches 200b.

When both the first group of switches 200a and the second group of switches are in the first state, the first direct current power supply 500a is connected to the first DC/DC circuit 400a through the first group of switches 200a, and the second direct current power supply 500b is connected to the second DC/DC circuit 400b through the second group of switches 200b.

When both the first group of switches 200a and the second group of switches 200b are in the second state, the second direct current power supply 500b is connected to the first DC/DC circuit 400a through the second group of switches 200b, and the first direct current power supply 500a is connected to the second DC/DC circuit 400b through the first group of switches 200a.

The following describes an implementation in which the switch circuit is connected between a DC/DC circuit and a DC/AC circuit.

Figure 19:
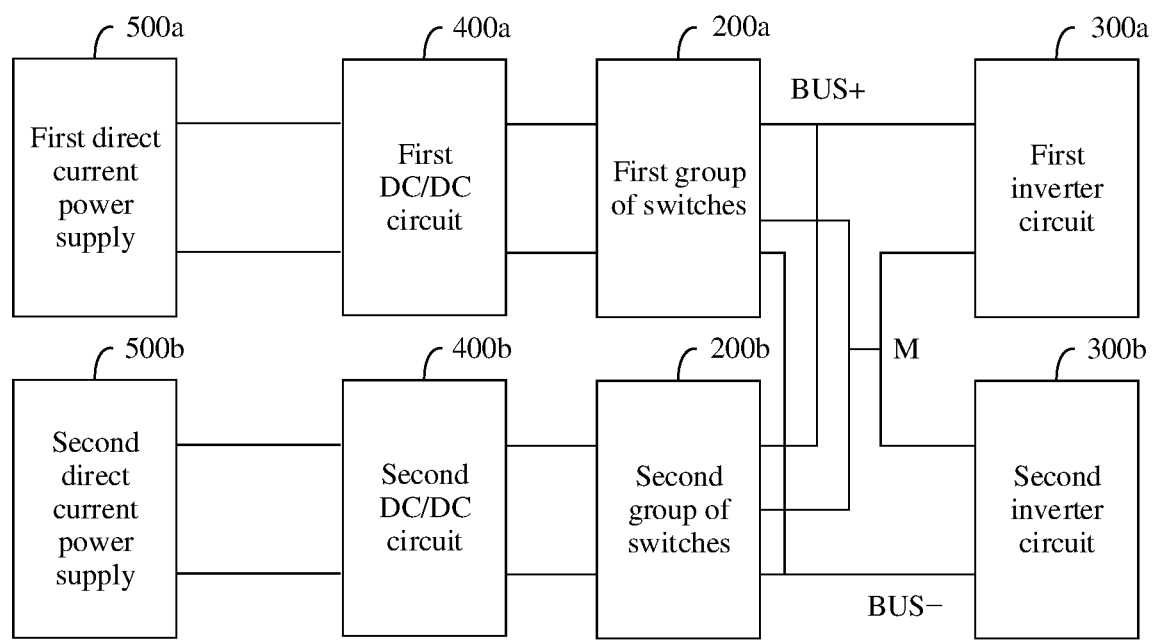
FIG. 19 is a schematic diagram of yet another power supply system according to an embodiment.

FIG. 19 is a schematic diagram of yet another bipolar system according to an embodiment.

The DC/DC converter provided in this embodiment includes the first DC/DC circuit 400a and the second DC/DC circuit 400b. The switch circuit includes the first group of switches 200a and the second group of switches 200b. Both the first group of switches 200a and the second group of switches 200b include a first state and a second state.

An output end of the first direct current power supply 500a is connected to an input end of the first DC/DC circuit

400a, and an output end of the first DC/DC circuit 400a is connected to the first group of switches 200a. An output end of a second direct current power supply 500b is connected to an input end of the second DC/DC circuit 400b, and an output end of the second DC/DC circuit 400b is connected to the second group of switches 200b.

When both the first group of switches 200a and the second group of switches 200b are in the first state, the first DC/DC circuit 400a is connected to the direct current positive bus and the neutral bus, and the second DC/DC circuit 400b is connected to the neutral bus and the direct current negative bus.

When both the first group of switches 200a and the second group of switches 200b are in the second state, the first DC/DC circuit 400a is connected to the neutral bus and the direct current negative bus, and the second DC/DC circuit 400b is connected to the direct current positive bus and the neutral bus.

A difference between the bipolar system provided in the embodiments and the bipolar photovoltaic system provided above lies only in that a photovoltaic array of the photovoltaic system is replaced with a direct current power supply. Others are the same. In other words, implementations and corresponding advantages of the embodiments of the photovoltaic system are also applicable to the bipolar system. For details, refer to the descriptions of the embodiments of the photovoltaic system. Details are not described herein again.

In addition, a potential of the neutral bus M in the bipolar photovoltaic system and the bipolar system provided in the foregoing embodiments may be equal to a ground potential or may be not equal to the ground potential. When the potential of M is equal to the ground potential, M may be grounded by using a fuse, a relay, a voltage regulator tube, or the like. When the potential of M is not equal to the ground potential, M may be grounded by using a voltage control circuit, and the voltage control circuit may adjust a voltage difference between M and ground. For system security, the voltage control circuit needs to control the voltage difference between M and ground to be within a safety threshold range.

Based on the bipolar photovoltaic system and the bipolar system provided in the foregoing embodiments, the embodiments may further provide a control method. The method may be applied to the foregoing two systems. The control method provided in the embodiments may be used to protect system security.

Because the system provided in the embodiments includes a positive potential and a negative potential, a switch circuit is added to the system, so that a potential of an input source can be switched, that is, the potential of the input source can be controlled to change, that is, potentials corresponding to two input sources can be switched. For example, the first direct current power supply is sometimes at a positive potential, and sometimes at a negative potential. The first direct current power supply is not operated at a negative potential for a long time, so that a service life of the first direct current power supply is prolonged. The input power source is a direct current power supply of the system. According to the control method, a switch action may be first controlled, and then each component in the system is started; or each component in the system may be first started, and then a switch action is controlled. An action sequence of the switch circuit and the components of the system may not be limited in the embodiments. For each component in the system, refer to the DC/AC circuit, the DC/DC circuit, and the like described in the foregoing system embodiments.

The following first describes several implementations of power-on.

Manner 1:
First, a switch is controlled to a first state or a second state.
Then, other components are started.

Manner 2:
First, components in the system are started.
Then, a switch is controlled to a first state or a second state.

The following describes several implementations of power-off.

Manner 1:
First, a switch in a switch circuit is turned off. The turning off herein refers to a switch that is not closed, and all switches are turned off.
Then, components in the system are shut down.

Manner 2:
First, components in the system are shut down.
Then, a switch in a switch circuit is turned off.

In the embodiments, a sequence relationship between the switch circuit and each component during power-on and power-off is not limited, provided that the switch circuit can switch a potential of the direct current power supply.

It should be understood that, "at least one (item)" refers to one or more and "a plurality of" refers to two or more. The term "and/or" may be used for describing an association relationship between associated objects and may represent that three relationships may exist. For example, "A and/or B" may represent the following three cases: only A exists, only B exists, and both A and B exist, where A and B may be singular or plural. A character "/" generally indicates an "or" relationship between associated objects before and after the character. "At least one of the following items (pieces)" or a similar expression thereof refers to any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

The foregoing embodiments are merely intended for describing but are not limiting. Although described in detail with reference to the foregoing embodiments, persons of ordinary skill in the art should understand that they may still make modifications without departing from the spirit and scope of the embodiments.

The invention claimed is:

1. A photovoltaic system, comprising,
a first inverter circuit comprising a first input end and a second input end which are respectively connected to a direct current positive bus and a neutral bus,
a second inverter circuit comprising a first input end and a second input end which are respectively connected to the neutral bus and a direct current negative bus; and
a switch circuit comprising a first state and a second state;
wherein the switch circuit is in the first state, a first photovoltaic array is connected to the direct current positive bus and the neutral bus through the switch circuit, and a second photovoltaic array is connected to the neutral bus and the direct current negative bus through the switch circuit; or
wherein the switch circuit is in the second state, the first photovoltaic array is connected to the neutral bus and the direct current negative bus through the switch circuit, and the second photovoltaic array is connected to the direct current positive bus and the neutral bus through the switch circuit.

2. The photovoltaic system according to claim 1, wherein the switch circuit further comprises:

a first group of switches and a second group of switches;

both the first group of switches and the second group of switches comprise the first state and the second state; and wherein both the first group of switches and the second group of switches are in the first state, the first photovoltaic array is connected to the direct current positive bus and the neutral bus through the first group of switches, and the second photovoltaic array is connected to the neutral bus and the direct current negative bus through the second group of switches; or wherein both the first group of switches and the second group of switches are in the second state, the first photovoltaic array is connected to the neutral bus and the direct current negative bus through the first group of switches, and the second photovoltaic array is connected to the direct current positive bus and the neutral bus through the second group of switches.

3. The photovoltaic system according to claim 2, wherein the first group of switches comprises:

a first single-pole double-throw switch and a second single-pole double-throw switch, and the second group of switches comprises a third single-pole double-throw switch and a fourth single-pole double-throw switch;

a movable contact of the first single-pole double-throw switch is connected to a positive output end of the first photovoltaic array, a first stationary contact and a second stationary contact of the first single-pole double-throw switch are respectively connected to the direct current positive bus and the neutral bus, a movable contact of the second single-pole double-throw switch is connected to a negative output end of the first photovoltaic array, a first stationary contact and a second stationary contact of the second single-pole double-throw switch are respectively connected to the neutral bus and the direct current negative bus, a movable contact of the third single-pole double-throw switch is connected to a positive output end of the second photovoltaic array, a first stationary contact and a second stationary contact of the third single-pole double-throw switch are respectively connected to the neutral bus and the direct current positive bus, a movable contact of the fourth single-pole double-throw switch is connected to a negative output end of the second photovoltaic array, and a first stationary contact and a second stationary contact of the fourth single-pole double-throw switch are respectively connected to the direct current negative bus and the neutral bus; and wherein all of the first single-pole double-throw switch, the second single-pole double-throw switch, the third single-pole double-throw switch, and the fourth single-pole double-throw switch are in the first state, the positive output end and the negative output end of the first photovoltaic array are respectively connected to the direct current positive bus and the neutral bus, and the positive output end and the negative output end of the second photovoltaic array are respectively connected to the neutral bus and the direct current negative bus; or wherein all of the first single-pole double-throw switch, the second single-pole double-throw switch, the third single-pole double-throw switch, and the fourth single-pole double-throw switch are in the second state, the positive output end and the negative output end of the first photovoltaic array are respectively connected to the neutral bus and the direct current negative bus, and the positive output end and the negative output end of the second photovoltaic array are respectively connected to the direct current positive bus and the neutral bus.

4. The photovoltaic system according to claim 2, wherein the first group of switches comprises:

a first switch, a second switch, a third switch, and a fourth switch, and the second group of switches comprises:

a fifth switch, a sixth switch, a seventh switch, and an eighth switch;

both a first end of the first switch and a first end of the second switch are connected to a positive output end of the first photovoltaic array, a second end of the first switch is connected to the direct current positive bus, a second end of the second switch is connected to the neutral bus, both a first end of the third switch and a first end of the fourth switch are connected to a negative output end of the first photovoltaic array, a second end of the third switch is connected to the neutral bus, a second end of the fourth switch is connected to the direct current negative bus, both a first end of the fifth switch and a first end of the sixth switch are connected to a positive output end of the second photovoltaic array, a second end of the fifth switch is connected to the neutral bus, a second end of the sixth switch is connected to the direct current positive bus, both a first end of the seventh switch and a first end of the eighth switch are connected to a negative output end of the second photovoltaic array, a second end of the seventh switch is connected to the direct current negative bus, and a second end of the eighth switch is connected to the neutral bus; and wherein all of the first switch, the third switch, the fifth switch, and the seventh switch are in the first state, and all of the second switch, the fourth switch, the sixth switch, and the eighth switch are in the second state, the positive output end and the negative output end of the first photovoltaic array are respectively connected to the direct current positive bus and the neutral bus, and the positive output end and the negative output end of the second photovoltaic array are respectively connected to the neutral bus and the direct current negative bus; or wherein all of the first switch, the third switch, the fifth switch, and the seventh switch are in the second state, and all of the second switch, the fourth switch, the sixth switch, and the eighth switch are in the first state, the positive output end and the negative output end of the first photovoltaic array are respectively connected to the neutral bus and the direct current negative bus, and the positive output end and the negative output end of the second photovoltaic array are respectively connected to the direct current positive bus and the neutral bus.

5. The photovoltaic system according to claim 1, further comprising:

a direct current/direct current (DC/DC) converter, wherein an input end of the DC/DC converter is connected to the first photovoltaic array and the second photovoltaic array, and an output end of the DC/DC converter is connected to the direct current positive bus, the neutral bus, and the direct current negative bus.

6. The photovoltaic system according to claim 5, wherein both the first photovoltaic array and the second photovoltaic array are connected to the input end of the DC/DC converter through the switch circuit.

7. The photovoltaic system according to claim 6, wherein the DC/DC converter further comprises:
a first DC/DC circuit and a second DC/DC circuit, the switch circuit further comprises:
a first group of switches and a second group of switches, and both the first group of switches and the second group of switches comprise the first state and the second state;
a positive output end and a negative output end of the first DC/DC circuit are respectively connected to the direct current positive bus and the neutral bus, and a positive output end and a negative output end of the second DC/DC circuit are respectively connected to the neutral bus and the direct current negative bus;
an output end of the first photovoltaic array is connected to the first group of switches, and an output end of the second photovoltaic array is connected to the second group of switches; and
wherein both the first group of switches and the second group of switches are in the first state, the first photovoltaic array is connected to the first DC/DC circuit through the first group of switches, and the second photovoltaic array is connected to the second DC/DC circuit through the second group of switches; or
wherein both the first group of switches and the second group of switches are in the second state, the second photovoltaic array is connected to the first DC/DC circuit through the second group of switches, and the first photovoltaic array is connected to the second DC/DC circuit through the first group of switches.

8. The photovoltaic system according to claim 7, wherein the first group of switches further comprises:
a first single-pole double-throw switch and a second single-pole double-throw switch, and the second group of switches further comprises:
a third single-pole double-throw switch and a fourth single-pole double-throw switch;
a movable contact of the first single-pole double-throw switch is connected to a positive output end of the first photovoltaic array, a movable contact of the second single-pole double-throw switch is connected to a negative output end of the first photovoltaic array, a first stationary contact and a second stationary contact of the first single-pole double-throw switch are respectively connected to a positive input end of the first DC/DC circuit and a positive input end of the second DC/DC circuit, a first stationary contact and a second stationary contact of the second single-pole double-throw switch are respectively connected to a negative input end of the first DC/DC circuit and a negative input end of the second DC/DC circuit, the negative input end of the first DC/DC circuit is connected to the positive input end of the second DC/DC circuit, a movable contact of the third single-pole double-throw switch is connected to a positive output end of the second photovoltaic array, a movable contact of the fourth single-pole double-throw switch is connected to a negative output end of the second photovoltaic array, a first stationary contact and a second stationary contact of the third single-pole double-throw switch are respectively connected to the negative input end of the first DC/DC circuit and the negative input end of the second DC/DC circuit, and a first stationary contact and a second stationary contact of the fourth single-pole double-throw switch are respectively connected to the positive input end of the first DC/DC circuit and the positive input end of the second DC/DC circuit; and wherein all of the first single-pole double-throw switch, the second single-pole double-throw switch, the third single-pole double-throw switch, and the fourth single-pole double-throw switch are in the first state, the positive output end and the negative output end of the first photovoltaic array are respectively connected to the positive input end and the negative input end of the first DC/DC circuit, and the positive output end and the negative output end of the second photovoltaic array are respectively connected to the positive input end and the negative input end of the second DC/DC circuit; or wherein all of the first single-pole double-throw switch, the second single-pole double-throw switch, the third single-pole double-throw switch, and the fourth single-pole double-throw switch are in the second state, the positive output end and the negative output end of the first photovoltaic array are respectively connected to the positive input end and the negative input end of the second DC/DC circuit, and the positive output end and the negative output end of the second photovoltaic array are respectively connected to the positive input end and the negative input end of the first DC/DC circuit.

9. The photovoltaic system according to claim 7, wherein the first group of switches further comprises:
a first switch, a second switch, a third switch, and a fourth switch, and the second group of switches further comprises:
a fifth switch, a sixth switch, a seventh switch, and an eighth switch;
both a first end of the first switch and a first end of the second switch are connected to a positive output end of the first photovoltaic array, a second end of the first switch is connected to a positive input end of the first DC/DC circuit, a second end of the second switch is connected to a positive input end of the second DC/DC circuit, both a first end of the third switch and a first end of the fourth switch are connected to a negative output end of the first photovoltaic array, a second end of the third switch is connected to a negative input end of the first DC/DC circuit, a second end of the fourth switch is connected to a negative input end of the second DC/DC circuit, both a first end of the fifth switch and a first end of the sixth switch are connected to a positive output end of the second photovoltaic array, a second end of the fifth switch is connected to the positive input end of the second DC/DC circuit, a second end of the sixth switch is connected to the positive input end of the first DC/DC circuit, both a first end of the seventh switch and a first end of the eighth switch are connected to a negative output end of the second photovoltaic array, a second end of the seventh switch is connected to the negative input end of the second DC/DC circuit, a second end of the eighth switch is connected to the negative input end of the first DC/DC circuit, and the negative input end of the first DC/DC circuit is connected to the positive input end of the second DC/DC circuit; and wherein all of the first switch, the third switch, the fifth switch, and the seventh switch are in the first state, and all of the second switch, the fourth switch, the sixth switch, and the eighth switch are in the second state, the positive output end and the negative output end of the first photovoltaic array are respectively connected to the positive input end and the negative input end of the first DC/DC circuit, and the positive output end and the negative output end of the second photovoltaic array are respectively connected to the positive input end and the negative input end of the second DC/DC circuit; or wherein all of the first switch, the third switch, the fifth switch, and the seventh switch are in the second state, and all of the second switch, the fourth switch, the sixth switch, and the eighth switch are in the first state, the positive output end and the negative output end of the first photovoltaic array are respectively connected to the positive input end and the negative input end of the second DC/DC circuit, and the positive output end and the negative output end of the second photovoltaic array are respectively connected to the positive input end and the negative input end of the first DC/DC circuit.

10. The photovoltaic system according to claim 5, wherein the output end of the DC/DC converter is connected to the direct current positive bus, the neutral bus, and the direct current negative bus through the switch circuit.

11. The photovoltaic system according to claim 10, wherein the DC/DC converter further comprises:
   a first DC/DC circuit and a second DC/DC circuit, the switch circuit further comprises:
   a first group of switches and a second group of switches, and both the first group of switches and the second group of switches comprise the first state and the second state;
   an output end of the first photovoltaic array is connected to an input end of the first DC/DC circuit, an output end of the first DC/DC circuit is connected to the first group of switches, an output end of the second photovoltaic array is connected to an input end of the second DC/DC circuit, and an output end of the second DC/DC circuit is connected to the second group of switches; and
   wherein both the first group of switches and the second group of switches are in the first state, the first DC/DC circuit is connected to the direct current positive bus and the neutral bus through the first group of switches, and the second DC/DC circuit is connected to the neutral bus and the direct current negative bus through the second group of switches; or
   wherein both the first group of switches and the second group of switches are in the second state, the first DC/DC circuit is connected to the neutral bus and the direct current negative bus through the first group of switches, and the second DC/DC circuit is connected to the direct current positive bus and the neutral bus through the second group of switches.

12. The photovoltaic system according to claim 11, wherein the first group of switches further comprises:
   a first single-pole double-throw switch and a second single-pole double-throw switch, and the second group of switches further comprises:
   a third single-pole double-throw switch and a fourth single-pole double-throw switch;
   a movable contact of the first single-pole double-throw switch is connected to a positive output end of the first DC/DC circuit, a first stationary contact and a second stationary contact of the first single-pole double-throw switch are respectively connected to the direct current positive bus and the neutral bus, a movable contact of the second single-pole double-throw switch is connected to a negative output end of the first DC/DC circuit, a first stationary contact and a second stationary contact of the second single-pole double-throw switch are respectively connected to the neutral bus and the direct current negative bus, a movable contact of the third single-pole double-throw switch is connected to a positive output end of the second DC/DC circuit, a first stationary contact and a second stationary contact of the third single-pole double-throw switch are respectively connected to the neutral bus and the direct current positive bus, a movable contact of the fourth single-pole double-throw switch is connected to a negative output end of the second DC/DC circuit, and a first stationary contact and a second stationary contact of the fourth single-pole double-throw switch are respectively connected to the direct current negative bus and the neutral bus; and wherein all of the first single-pole double-throw switch, the second single-pole double-throw switch, the third single-pole double-throw switch, and the fourth single-pole double-throw switch are in the first state, the positive output end and the negative output end of the first DC/DC circuit are respectively connected to the direct current positive bus and the neutral bus, and the positive output end and the negative output end of the second DC/DC circuit are respectively connected to the neutral bus and the direct current negative bus; or wherein all of the first single-pole double-throw switch, the second single-pole double-throw switch, the third single-pole double-throw switch, and the fourth single-pole double-throw switch are in the second state, the positive output end and the negative output end of the first DC/DC circuit are respectively connected to the neutral bus and the direct current negative bus, and the positive output end and the negative output end of the second DC/DC circuit are respectively connected to the direct current positive bus and the neutral bus.

13. The photovoltaic system according to claim 11, wherein the first group of switches further comprises:
   a first switch, a second switch, a third switch, and a fourth switch, and the second group of switches further comprises:
   a fifth switch, a sixth switch, a seventh switch, and an eighth switch;
   both a first end of the first switch and a first end of the second switch are connected to a positive output end of the first DC/DC circuit, a second end of the first switch and a second end of the second switch are respectively connected to the first input end of the first inverter circuit and the first input end of the second inverter circuit, both a first end of the third switch and a first end of the fourth switch are connected to a negative output end of the first DC/DC circuit, a second end of the third switch and a second end of the fourth switch are respectively connected to the second input end of the first inverter circuit and the second input end of the second inverter circuit, both a first end of the fifth switch and a first end of the sixth switch are connected to a positive output end of the second DC/DC circuit, a second end of the fifth switch and a second end of the sixth switch are respectively connected to the first input end of the second inverter circuit and the first input end of the first inverter circuit, both a first end of the seventh switch and a first end of the eighth switch are connected to a negative output end of the second DC/DC circuit, a second end of the seventh switch and a second end of the eighth switch are respectively connected to the second input end of the second inverter circuit and the second input end of the first inverter circuit, and the second input end of the first inverter circuit is connected to the first input end of the second inverter circuit; and wherein all of the first switch, the third switch, the fifth switch, and the seventh switch are in the first state, and all of the second switch, the fourth switch, the sixth switch, and the eighth switch are in the second state, the positive output end and the negative output end of the first DC/DC circuit are respectively connected to the direct current positive bus and the neutral bus, and the positive output end and the negative output end of the second DC/DC circuit are respectively connected to the neutral bus and the direct current negative bus; or wherein all of the first switch, the third switch, the fifth switch, and the seventh switch are in the second state, and all of the second switch, the fourth switch, the sixth switch, and the eighth switch are in the first state, the positive output end and the negative output end of the first DC/DC circuit are respectively connected to the neutral bus and the direct current negative bus, and the positive output end and the negative output end of the second DC/DC circuit are respectively connected to the direct current positive bus and the neutral bus.

14. A power supply system, comprising,
a first inverter circuit comprising a first input end and a second input end which are respectively connected to a direct current positive bus and a neutral bus;
a second inverter circuit comprising a first input end and a second input end which are respectively connected to the neutral bus and a direct current negative bus;
the switch circuit comprising a first state and a second state; and
when the switch circuit is in the first state, a first direct current power supply is connected to the direct current positive bus and the neutral bus through the switch circuit, and a second direct current power supply is connected to the neutral bus and the direct current negative bus through the switch circuit; or
wherein the switch circuit is in the second state, the first direct current power supply is connected to the neutral bus and the direct current negative bus through the switch circuit, and the second direct current power supply is connected to the direct current positive bus and the neutral bus through the switch circuit.

15. The power supply system according to claim 14, wherein the switch circuit further comprises:
a first group of switches and a second group of switches;
both the first group of switches and the second group of switches comprise the first state and the second state; and
when both the first group of switches and the second group of switches are in the first state, the first direct current power supply is connected to the direct current positive bus and the neutral bus through the switch circuit, and the second direct current power supply is connected to the neutral bus and the direct current negative bus through the switch circuit; or
when both the first group of switches and the second group of switches are in the second state, the first direct current power supply is connected to the neutral bus and the direct current negative bus through the switch circuit, and the second direct current power supply is connected to the direct current positive bus and the neutral bus through the switch circuit.

16. The power supply system according to claim 14, further comprising:
a direct current/direct current DC/DC converter, wherein an input end of the DC/DC converter is connected to the first direct current power supply and the second direct current power supply, and an output end of the DC/DC converter is connected to the direct current positive bus, the neutral bus, and the direct current negative bus.

17. The power supply system according to claim 16, wherein both the first direct current power supply and the second direct current power supply are connected to the input end of the DC/DC converter through the switch circuit.

18. The power supply system according to claim 17, wherein the DC/DC converter further comprises:
a first DC/DC circuit and a second DC/DC circuit, the switch circuit comprises a first group of switches and a second group of switches, and both the first group of switches and the second group of switches comprise the first state and the second state;
a positive output end and a negative output end of the first DC/DC circuit are respectively connected to the direct current positive bus and the neutral bus, and a positive output end and a negative output end of the second DC/DC circuit are respectively connected to the neutral bus and the direct current negative bus;
an output end of the first direct current power supply is connected to the first group of switches, and an output end of the second direct current power supply is connected to the second group of switches; and
when both the first group of switches and the second group of switches are in the first state, the first direct current power supply is connected to the first DC/DC circuit through the first group of switches, and the second direct current power supply is connected to the second DC/DC circuit through the second group of switches; or
when both the first group of switches and the second group of switches are in the second state, the second direct current power supply is connected to the first DC/DC circuit through the second group of switches, and the first direct current power supply is connected to the second DC/DC circuit through the first group of switches.

19. The power supply system according to claim 16, wherein the output end of the DC/DC converter is connected to the direct current positive bus, the neutral bus, and the direct current negative bus through the switch circuit.

20. The power supply system according to claim 19, wherein the DC/DC converter further comprises:
a first DC/DC circuit and a second DC/DC circuit, the switch circuit further comprises:
a first group of switches and a second group of switches, and both the first group of switches and the second group of switches comprise the first state and the second state;
an output end of the first direct current power supply is connected to an input end of the first DC/DC circuit, an output end of the first DC/DC circuit is connected to the first group of switches, an output end of the second direct current power supply is connected to an input end of the second DC/DC circuit, and an output end of the second DC/DC circuit is connected to the second group of switches; and
when both the first group of switches and the second group of switches are in the first state, the first DC/DC circuit is connected to the direct current positive bus and the neutral bus, and the second DC/DC circuit is connected to the neutral bus and the direct current negative bus; or
when both the first group of switches and the second group of switches are in the second state, the first DC/DC circuit is connected to the neutral bus and the direct current negative bus, and the second DC/DC circuit is connected to the direct current positive bus and the neutral bus.

* * * * *

UNITED STATES PATENT AND TRADEMARK OFFICE
CERTIFICATE OF CORRECTION

PATENT NO. : 12,107,538 B2
APPLICATION NO. : 18/328902
DATED : October 1, 2024
INVENTOR(S) : Ting Yu et al.

Page 1 of 1

It is certified that error appears in the above-identified patent and that said Letters Patent is hereby corrected as shown below:

In the Claims

Column 43, Claim 14, Line 28, change from "the switch circuit" to "a switch circuit".

Column 43, Claim 14, Line 36, change from "wherein the switch" to "wherein when the switch circuit".

Signed and Sealed this
Thirty-first Day of December, 2024

Derrick Brent
*Acting Director of the United States Patent and Trademark Office*